(12) United States Patent
Tamura

(10) Patent No.: US 7,813,629 B2
(45) Date of Patent: Oct. 12, 2010

(54) PHOTOGRAPHING APPARATUS, AND CONTROL METHOD AND COMPUTER PROGRAM PRODUCT FOR CONTROLLING THE SAME

(75) Inventor: Kazunori Tamura, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 267 days.

(21) Appl. No.: 12/177,391

(22) Filed: Jul. 22, 2008

(65) Prior Publication Data

US 2009/0028537 A1    Jan. 29, 2009

(30) Foreign Application Priority Data

Jul. 23, 2007  (JP)  ............................. 2007-190495
Jul. 23, 2007  (JP)  ............................. 2007-190496

(51) Int. Cl.
*G03B 17/00*  (2006.01)
*H04N 5/228*  (2006.01)

(52) U.S. Cl. .................................... 396/55; 348/208.99

(58) Field of Classification Search ................... 396/55, 396/155, 157, 158; 348/208.99, 208.5, 208.7, 348/208.11, 208.12

See application file for complete search history.

(56) References Cited

U.S. PATENT DOCUMENTS 5,598,246 A    1/1997    Miyamoto et al.
7,466,910 B2 *  12/2008    Akada et al. ................... 396/55

FOREIGN PATENT DOCUMENTS

JP    06-051363 A    2/1994

* cited by examiner

*Primary Examiner*—W. B. Perkey
*Assistant Examiner*—Minh Q Phan
(74) *Attorney, Agent, or Firm*—Sughrue Mion, PLLC

(57) ABSTRACT

A photographing apparatus including: a photographing means that photographs a subject to obtain an image representing the subject by receiving an instruction to perform photographing; a camera shake correction means constructed to be driven in a direction different from the optical axis of the photographing means and corrects a camera shake induced blur of an image to be obtained by the photographing; and a correction system driving means that receives an instruction to perform main photographing and initiates driving of the camera shake correction means from a first predetermined position during a period from the time when the instruction to perform main photographing is given to the time when the subject is photographed, and drives the camera shake correction means to a second predetermined position during a period from the time when the driving is initiated to the time when the main photographing is performed.

15 Claims, 29 Drawing Sheets

| 1 | 1 | 1 | 1 | 1 | 1 | 1 | 1 |
|---|---|---|---|---|---|---|---|
| 1 | 2 | 2 | 2 | 2 | 2 | 2 | 1 |
| 1 | 2 | 5 | 5 | 5 | 5 | 2 | 1 |
| 1 | 2 | 5 | 10 | 10 | 5 | 2 | 1 |
| 1 | 2 | 5 | 10 | 10 | 5 | 2 | 1 |
| 1 | 2 | 5 | 5 | 5 | 5 | 2 | 1 |
| 1 | 2 | 2 | 2 | 2 | 2 | 2 | 1 |
| 1 | 1 | 1 | 1 | 1 | 1 | 1 | 1 |

| PRE-LIGHT-CONTROL DRIVING | PERFORMED |
|---|---|
| POST-LIGHT-CONTROL DRIVING | PERFORMED |
| PRE-LIGHT-CONTROL RETURNED POSITION | CENTER OF DRIVE |
| POST-LIGHT-CONTROL RETURNED POSITION | CENTER OF DRIVE |

FIG.32

| DRIVE RANGE AT LIGHT CONTROL | 50% |
|---|---|
| CORRECTION RATIO AT LIGHT CONTROL | 80% |
| POST-LIGHT-CONTROL RETURNED POSITION | CENTER OF DRIVE |

PHOTOGRAPHING APPARATUS, AND CONTROL METHOD AND COMPUTER PROGRAM PRODUCT FOR CONTROLLING THE SAME

BACKGROUND OF THE INVENTION

1. Field of the Invention

The present invention relates to a photographing apparatus, such as a digital camera or the like, having a camera shake correction function and a control method of the apparatus. The invention also relates to a computer program product for causing a computer to perform the control method.

2. Description of the Related Art

Digital cameras having a camera shake correction function that prevents an image blur arising from a camera shake at the time of photographing are proposed. The camera shake correction function prevents a camera shake induced blur of an image to be obtained by photographing by detecting an amount of camera shake caused by hand movement using a camera shake sensor, such as an acceleration sensor or the like, and driving a camera shake correction lens constituting a taking lens or a camera shake correction system constituted by an image sensor, such as a CCD or the like, in the direction opposite to the direction of the blur and orthogonal to the optical axis based on the detection result.

In the mean time, cameras having red-eye reduction capabilities are known. In such type of cameras, for example, light emission is initiated from a red-eye reduction lamp in response to a full depressing operation of the release button, and photographing is performed after a predetermined time. This causes a flash photograph to be taken with the pupils of a subject (person) seeing the light emitted from the red-eye reduction lamp being contracted, so that red-eye effects are less noticeable on the obtained image.

For cameras having a camera shake correction function, when performing such red-eye reduction operation, it is necessary for the camera shake correction function not to be affected by the red-eye reduction operation. Consequently, a camera in which a camera shake correction system is driven after a predetermined time from a red-eye reduction operation is proposed as described, for example, in U.S. Pat. No. 5,598,246. Another camera in which focusing is performed after receiving an instruction to perform main photographing, then red-eye reduction operation is performed, and a camera shake correction operation is performed after the camera shake correction system is driven to a predetermined initial position is proposed as described, for example, in U.S. Pat. No. 5,598,246. Still another camera in which a red-eye reduction operation is performed after receiving an instruction to perform main photographing, then a camera shake correction system is driven to a predetermined initial position, such as the center of drive in addition to a focusing operation, and a camera shake correction operation is initiated after a predetermined time from the red-eye reduction operation with a simultaneous flash emission is proposed as described, for example, in U.S. Pat. No. 5,598,246. Here, the camera shake correction system can be moved the most in every direction orthogonal to the optical axis when placed at the predetermined initial position. Therefore, when the camera shake correction system is driven to the predetermined initial position, effective camera shake correction results may be obtained.

Further, a camera in which drive performance of the camera shake correction system is changed according to photographing mode of the camera in order to obtain an image with an unnecessary image blur being suppressed according to the photographing conditions is proposed as described, for example, in Japanese Unexamined Patent Publication No. 6(1994)-051363.

Still further, a method that obtains images through non-flash and flash exposures prior to main photographing and controls the emission amount of flash at the time of the main photographing using the two images (i.e., performing light control) is also proposed. The non-flash and flash exposures are, hereinafter, collectively referred to as "light control exposure", and calculation of emission amount using the results of the light control exposure is referred to as "light control calculation". In this way, by controlling the emission amount of flash through the light control exposure and light control calculation, an image having appropriate brightness may be obtained.

In the mean time, if a camera shake correction system is driven when performing light control exposure, camera shake effects may be removed from an image obtained through the light control exposure, which will result in improved accuracy of the light control. If the camera shake correction system is driven at the time of light control exposure and then main photographing is performed, however, it is often the case that the camera shake correction system is not placed at the center of drive when the main photographing is performed. This will limit the drive range of the camera shake correction system, so that camera shake correction may not be performed accurately when the main photographing is performed.

SUMMARY OF THE INVENTION

The present invention has been developed in view of the circumstances described above, and it is an object of the present invention to enable a photographing apparatus, such as a digital camera or the like, having a camera shake correction function to perform camera shake correction effectively.

A first photographing apparatus according to the present invention is an apparatus including:

a photographing means that photographs a subject to obtain an image representing the subject by receiving an instruction to perform photographing;

a camera shake correction means constructed to be driven in a direction different from the optical axis of the photographing means and corrects a camera shake induced blur of an image to be obtained by the photographing; and a correction system driving means that receives an instruction to perform main photographing and initiates driving of the camera shake correction means from a first predetermined position during a period from the time when the instruction to perform main photographing is given to the time when the subject is photographed, and drives the camera shake correction means to a second predetermined position during a period from the time when the driving is initiated to the time when the main photographing is performed.

The term "camera shake correction means" as used herein means any means which is driven in a direction different from the optical axis for correcting a camera shake, such as a camera shake correction optical system constituting the taking lens, an image pickup device, and the like. As for "a direction different from the optical axis", a direction orthogonal to the optical direction may be cited as an example, but not limited to this.

The term "first predetermined position" or "second predetermined position" means a controlled position of the camera shake correction means that allows the camera shake correction means to be driven maximally. For example, it is a position determined as the center of control of the camera shake correction means, more specifically, it maybe the center of drive of the camera shake control means or an arbitrary point within a predetermined range around the center of drive.

The term "main photographing" as used herein means photographing of a subject to obtain a main photograph representing the subject performed when the release button is depressed fully. It is different from pre-photographing to prepare for photographing, such as AE and AF processing performed when the release button is depressed halfway.

In the first photographing apparatus according to the present invention, the correction system driving means may be a means that determines whether or not the camera shake correction means is located at the first predetermined position when the instruction to perform main photographing is received and, if the determination is negative, drives the camera shake correction means to the first predetermined position before initiating the driving of the camera shake correction means.

Further, the first photographing apparatus according to the present invention may further includes: an emission means that emits a flash; and an emission control means that, upon receipt of the instruction to perform main photographing, controls the emission amount of the flash at the time of the main photographing by performing a flash exposure and a non-flash exposure and performing a calculation based on a result of the exposures prior to the main photographing, wherein the correction system driving means may be a means that drives the camera shake correction means to the first predetermined position before a first time point during the period of the exposures, and drives the camera shake correction means to the second predetermined position after a second time point during the period of the exposures following the first time point.

The emission means may be a built-in flash or a removably attachable external flash.

Further, in the first photographing apparatus according to the present invention, the correction system driving means may be a means that drives the camera shake correction means to the predetermined second position while the calculation based on the result of the exposures is performed.

Still further, in the first photographing apparatus according to the present invention, when causing the emission means to emit red-eye reduction light, the correction system driving means may be a means that drives the camera shake correction means to the predetermined first position while the red-eye reduction light is emitted or during a predetermined period after the emission of the red-eye reduction light.

As for "a predetermined period after the emission of red-eye reduction light", for example, a time immediately after the emission of the red-eye reduction light, or where a flash exposure and a non-flash exposure are performed prior to the main photographing, a time before the exposures may be pointed out.

Further, in the first photographing apparatus according to the present invention, at least one of the first and second predetermined positions may be the center of drive of the camera shake correction means.

Still further, in the first photographing apparatus according to the present invention, the first and second predetermined positions may be the same position.

Further, the first photographing apparatus according to the present invention may further include a storage means that stores information of the first and second predetermined positions.

Still further, in the first photographing apparatus according to the present invention, the correction system driving means may be a means that causes the camera shake correction means to have different drive performance from each other before the driving thereof from the first predetermined position is initiated and at an arbitrary time point after the driving thereof from the first predetermined position is initiated.

In this case, the correction system driving means may be a means that causes the camera shake correction means to have different drive performance from each other during a period from the time when an instruction to prepare for photographing is received to the time when the instruction to perform main photographing is received and at an arbitrary time point after the driving thereof from the first predetermined position is initiated.

The term "an instruction to prepare for photographing" as used herein means is, for example, an instruction given by depressing the release button halfway to cause the preparation for photographing, such as AE and AF processing, to be performed.

Further, in the first photographing apparatus according to the present invention, when driving the camera shake correction means to the first and/or second predetermined position, the correction system driving means may be a means that detects a position of the camera shake correction means and determines whether or not to drive the camera shake correction means to the first and/or second predetermined position according to the detected position.

In this case, the correction system driving means may be a means that inhibits the driving of the camera shake correction means to the first and/or second predetermined position when the detected position of the camera shake correction means is within a first predetermined range and within a second predetermined range from the first and/or second predetermined position respectively.

Further, the first photographing apparatus according to the present invention may further include an information attaching means that attaches drive information of the camera shake correction means to a main photograph obtained by the main photographing.

A first photographing apparatus control method according to the present invention is a control method of a photographing apparatus which includes a photographing means that photographs a subject to obtain an image representing the subject by receiving an instruction to perform photographing, and a camera shake correction means constructed to be driven in a direction different from the optical axis of the photographing means and corrects a camera shake induced blur of an image to be obtained by the photographing, the method including the steps of:

receiving an instruction to perform main photographing;

initiating driving of the camera shake correction means from a first predetermined position during a period from the time when the instruction to perform main photographing is given to the time when the subject is photographed; and driving the camera shake correction means to a second predetermined position during a period from the time when the driving is initiated to the time when the main photographing is performed.

It is noted that the first photographing apparatus control method according to the present invention may be provided as a computer program product for causing a computer to perform the method.

According to the first photographing apparatus and control method of the present invention, an instruction to perform main photographing is received and driving of the camera shake correction means is initiated from a first predetermined position during a period from the time when the instruction to perform main photographing is given to the time when the subject is photographed, and the camera shake correction means is driven to a second predetermined position during a period from the time when the driving is initiated to the time when the main photographing is performed. In this way, by driving the camera shake correction means from the first predetermined position and the second predetermined position, the camera shake correction means may be driven maximally within the drive range in any direction at the time of the main photographing, allowing an effective camera shake correction.

Further, if the camera shake correction means is not located at the first predetermined position when the instruction to perform main photographing is received, the camera shake correction means is driven to the first predetermined position before the driving of the camera shake correction means is initiated, so that the camera shake correction means may be reliably driven from the first predetermined position at the time of the main photographing.

Still further, when performing a so-called light control exposure in which a flash exposure and a non-flash exposure are performed and a calculation based on a result of the exposures is performed prior to the main photographing to control the emission amount of the flash at the time of the main photographing, driving of the camera shake correction means to the first predetermined position prior to a first time point during the period of the exposures, and driving of the camera shake correction means to the predetermined second position after a second time point during the period of the exposures following the first time point allows the camera shake control means to be driven maximally within the drive range in any direction after the first and second time points during the period of the exposures. As a result, an efficient camera shake correction may be performed also at the time of the light control exposure.

Further, driving of the camera shake correction means to the predetermined second position during a period including the period in which the calculation based on the result of the exposures is performed allows the camera shake correction means to be driven to the predetermined first position without affecting the light control exposure and main photographing through the use of a period that does not require camera shake correction.

Still further, where red-eye reduction light is emitted, driving of the camera shake correction means to the predetermined first position while the red-eye reduction light is emitted or during a predetermined period after the emission of the red-eye reduction light allows the camera shake correction means to be driven to the predetermined first position without affecting the light control exposure and main photographing through the use of a period that does not require camera shake correction.

Further, when at least one of the first and second predetermined positions is the center of drive of the camera shake correction means, the camera shake correction means may be driven maximally within the drive range in any direction which, as a result, allows an efficient camera shake correction.

Still further, when the first and second predetermined positions are the same position, control of the camera shake correction means becomes easy.

Further, storage of information of the first and second predetermined positions eases control of the camera shake correction means.

Still further, by causing the camera shake correction means to have different drive performance from each other before the driving thereof from the first predetermined position is initiated and at an arbitrary time point after the driving thereof from the first predetermined position is initiated, the drive range of the camera shake correction means before the initiation of the driving of the camera shake correction means from the first predetermined position may be limited, so that the camera shake correction means may be driven rapidly to the first predetermined position.

In particular, by changing the drive performance of the camera shake correction means during a period from the time when an instruction to prepare for photographing is received to the time when the instruction to perform main photographing is received, the camera shake correction means may be reliably driven to the first predetermined position when the instruction to perform main photographing is received, so that a camera shake correction that follows may be performed efficiently.

Further, when the position of the camera shake correction means is within a first predetermined range and within a second predetermined range from the first and/or second predetermined position respectively, inhibition of the driving of the camera shake correction means to the first and/or second predetermined position, in particular, when the camera shake correction means is located near the first and/or second predetermined position, allows the camera shake correction means to be driven from that position without bothering to drive the camera shake correction means to the first and/or second predetermined position. This may prevent wasteful drive of the camera shake correction means and wasteful power consumption of the photographing apparatus.

Still further, by attaching drive information of the camera shake correction means to a main photograph, the state of camera shake at the time of main photographing may be known from the information, so that image processing according to the state of the camera shake may be performed on the main photograph.

A second photographing apparatus according to the present invention is an apparatus including:

a photographing means that photographs a subject to obtain an image representing the subject by receiving an instruction to perform photographing;

a camera shake correction means constructed to be driven in a direction different from the optical axis of the photographing means and corrects a camera shake induced blur of an image to be obtained by the photographing; and a correction system driving means that receives an instruction to perform main photographing and drives the camera shake correction means such that the camera shake correction means has different drive performance from each other during a predetermined period from the time when the instruction to perform main photographing is given to the time when the subject is photographed and at a different time point from the predetermined period.

The term "camera shake correction means" as used herein means any means which is driven in a direction different from the optical axis for correcting a camera shake, such as a camera shake correction optical system constituting the taking lens, an image pickup device, and the like. As for "a direction different from the optical axis", a direction orthogonal to the optical direction may be cited as an example, but not limited to this.

The term "main photographing" as used herein means photographing of a subject to obtain a main photograph representing the subject performed when the release button is depressed fully. It is different from pre-photographing to prepare for photographing, such as AE and AF processing performed when the release button is depressed halfway.

In the second photographing apparatus according to the present invention, the correction system driving means may be a means that drives the camera shake correction means such that the camera shake correction means has different drive performance from each other during the predetermined period and at the different time point by limiting a drive range of the camera shake correction means during the predetermined period smaller than a drive range thereof at the different time point.

The term "limiting" as used herein means not only narrowing the drive range but also reducing the amount of correction.

Further, in the second photographing apparatus according to the present invention, the different time point may be at least one of a period from the time when an instruction to prepare for photographing is received to the time when the instruction to perform main photographing is received and a period of exposure at the time of the main photographing.

Still further, in the second photographing apparatus according to the present invention, the correction system driving means may be a means that controls the drive performance of the camera shake correction means during the predetermined period according to the shutter speed at the time of the main photographing.

The term "an instruction to prepare for photographing" as used herein means is, for example, an instruction given by depressing the release button halfway to cause the preparation for photographing, such as AE and AF processing, to be performed.

Further, in the second photographing apparatus according to the present invention, the correction system driving means may be a means that controls the drive performance of the camera shake correction means during the predetermined period according to the focal length at the time of the main photographing.

Still further, the second photographing apparatus according to the present invention may further include: an emission means that emits a flash; and an emission control means that, upon receipt of the instruction to perform main photographing, controls the emission amount of the flash at the time of the main photographing by performing a flash exposure and a non-flash exposure and performing a calculation based on the exposure results prior to the main photographing, wherein the correction system driving means may be a means that drives the camera shake correction means with a period of the exposures as the predetermined period.

The emission means may be a built-in flash or a removably attachable external flash.

In this case, the correction system driving means may be a means that drives the camera shake correction means to a predetermined position at least at one of a predetermined first time point during a period from the time when the instruction to perform main photographing is received to the time when the exposures are initiated and a predetermined second time point during a period from the time when the exposures are initiated to the time when the subject is photographed.

The term "predetermined position" means a controlled position of the camera shake correction means that allows the camera shake correction means to be driven maximally. For example, it is a position determined as the center of control of the camera shake correction means, more specifically, it may be the center of drive of the camera shake control means or an arbitrary point within a predetermined range around the center of drive.

In this case, the photographing apparatus may further include a storage means that stores information of the predetermined position.

Further, in the second photographing apparatus according to the present invention, the correction system driving means may be a means that changes the drive performance of the camera shake correction means according to the position of the camera shake correction means at least at one of the first and second predetermined time points.

Still further, in the second photographing apparatus according to the present invention, the correction system driving means may be a means that changes the drive performance of the camera shake correction means by changing the predetermined position according to the positions of the camera shake correction means at the predetermined time points.

Further, in the second photographing apparatus according to the present invention, the correction system driving means may be a means that drives the camera shake correction means to the predetermined position while the calculation based on the exposure results is performed.

Still further, in the second photographing apparatus according to the present invention, the correction system driving means may be a means that causes the camera shake correction means to have different drive performance from each other at least at two time points during the period of the exposures. More specifically, the correction system driving means may be a means that reduces the drive range of the camera shake correction means according to the elapsed time from the initiation of the exposures.

Further, in the second photographing apparatus according to the present invention, the correction system driving means may be a means that causes the camera shake correction means to have different drive performance according to the position thereof during the period of the exposures. More specifically, the correction system driving means may be a means that drives the camera shake correction means to the predetermined position according to the distance between the position of the camera shake correction means during the period of the exposures and the predetermined position.

Still further, the second photographing apparatus according to the present invention may further include an information attaching means that attaches drive information of the camera shake correction means to a main photograph obtained by the main photographing.

A second photographing apparatus control method is a control method of a photographing apparatus which includes a photographing means that photographs a subject to obtain an image representing the subject by receiving an instruction to perform photographing, and a camera shake correction means constructed to be driven in a direction different from the optical axis of the photographing means and corrects a camera shake induced blur of an image to be obtained by the photographing, the method including the step of receiving an instruction to perform main photographing and driving the camera shake correction means such that the camera shake correction means has different drive performance from each other during a predetermined period from the time when the instruction to perform main photographing is given to the time when the subject is photographed and at a different time point from the predetermined period.

It is noted that the second photographing apparatus control method according to the present invention may be provided as a computer program product for causing a computer to perform the method.

According to the second photographing apparatus and control method of the present invention, the camera shake correction means is driven such that the camera shake correction means has different drive performance from each other during a predetermined period from the time when the instruction to perform main photographing is given to the time when the subject is photographed and at a different time point from the predetermined period. This allows drive performance of the camera shake correction means during the predetermined period to be limited without affecting the driving of the photographing apparatus at the time point different from the predetermined period. In particular, by limiting a drive range of the camera shake correction means during the predetermined period smaller than a drive range thereof at the different time point from the predetermined period, the camera shake correction means may be driven without definitely affecting the driving of the photographing apparatus at the time point different from the predetermined period.

Further, by setting a period of exposure at the time of the main photographing as the different time point, the camera shake correction means may be driven without affecting photographing of the subject. Still further, by setting a period from the time when an instruction to prepare for photographing is received to the time when the instruction to perform main photographing is received as the different time point, the camera shake correction means may be driven without affecting the driving of the photographing apparatus during the period from the time when an instruction to prepare for photographing is received to the time when the instruction to perform main photographing is received.

Further, by controlling the drive performance of the camera shake correction means during the predetermined period according to the shutter speed at the time of the main photographing, the camera shake correction means may be driven effectively considering the amount of correction required at the time of the main photographing.

Still further, by controlling the drive performance of the camera shake correction means during the predetermined period according to the focal length at the time of the main photographing, the camera shake correction means may be driven effectively considering the amount of correction required at the time of the main photographing.

Further, when performing a so-called light control exposure in which a flash exposure and a non-flash exposure are performed and a calculation based on the results of the exposures is performed prior to main photographing to control the emission amount of the flash at the time of the main photographing, driving of the camera shake correction means with a period of the exposures as the predetermined period allows driving of the camera shake correction means during the light control exposure to be performed without affecting driving of the photographing apparatus at the different time point.

Still further, driving of the camera shake correction means to a predetermined position at least at one of a predetermined first time point during the period from the time when the instruction to perform main photographing is received to the time when the exposures are initiated and a predetermined second time point during a period from the time when the exposures are initiated to the time when the subject is photographed allows the camera shake correction means to be driven maximally within the drive range in any direction. As a result, an efficient camera shake correction may be performed during the light control exposure and/or main photographing.

Further, by setting the center of drive of the camera shake correction means as the predetermined position, the camera shake correction means may be driven maximally within the drive range in any direction, thereby allowing an efficient camera shake correction.

Still further, storage of information of the predetermined position eases control of the camera shake correction means.

Further, by changing the drive performance of the camera shake correction means according to the position thereof at least at one of the first and second predetermined time points, in particular, by changing the predetermined position according to the position of the camera shake correction means at the predetermined time point, the camera shake correction means may be driven so as to be driven to a position as close to the original predetermined position as possible. This allows an efficient camera shake correction during the light control exposure and/or main photographing.

Still further, driving of the camera shake correction means to the predetermined position during a period including the period in which the calculation based on the result of the exposures is performed allows the camera shake correction means to be driven to the predetermined position without affecting the light control exposure and main photographing through the use of a period that does not require camera shake correction.

Further, by causing the camera shake correction means to have different drive performance from each other at least at two time points during the period of the exposures, more specifically, by reducing the drive range of the camera shake correction means according to the elapsed time from the initiation of the exposures, the drive range of the camera shake correction means may be made narrower as the main photographing draws nearer. This allows the camera shake correction means to be driven to a position where the camera shake correction means may be driven largely prior to the main photographing, allowing, as a result, an efficient camera shake control at the time of the main photographing.

Still further, by causing the camera shake correction means to have different drive performance from each other according to a position thereof during the period of the exposures, more specifically, by driving the camera shake correction means to the predetermined position according to the distance between the position of the camera shake correction means during the period of the exposures and the predetermined position, the camera shake correction means may be prevented from largely departing from the predetermined position prior to the main photographing, so that a camera shake correction may be performed efficiently at the time of the main photographing.

Further, by attaching drive information of the camera shake correction means to a main photograph, the state of camera shake at the time of the main photographing may be known from the information, so that image processing according to the state of the camera shake may be performed on the main photograph.

BRIEF DESCRIPTION OF THE DRAWINGS

FIG. 32 illustrates an example of drive information (part 2).

DESCRIPTION OF THE PREFERRED EMBODIMENTS

Hereinafter, exemplary embodiments of a single-lens reflex digital camera, which is an example of the photographing apparatus of the present invention, and control methods of the digital camera, will be described.

Figure 1:
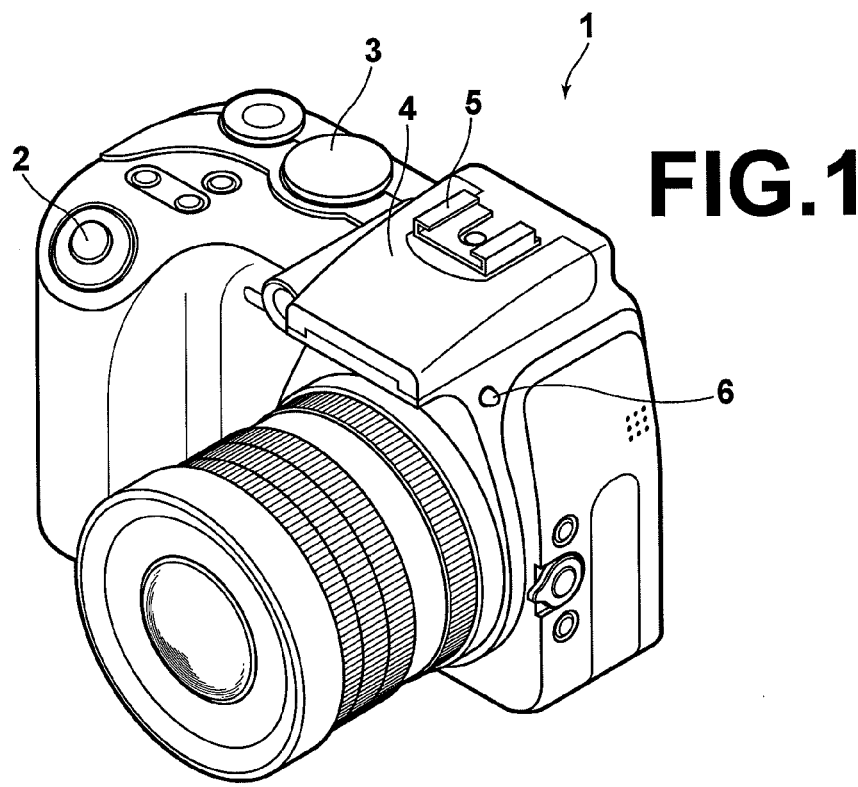
FIG. 1 is an overview of a digital camera according to one embodiment of the present invention (normal state).
Figure 2:
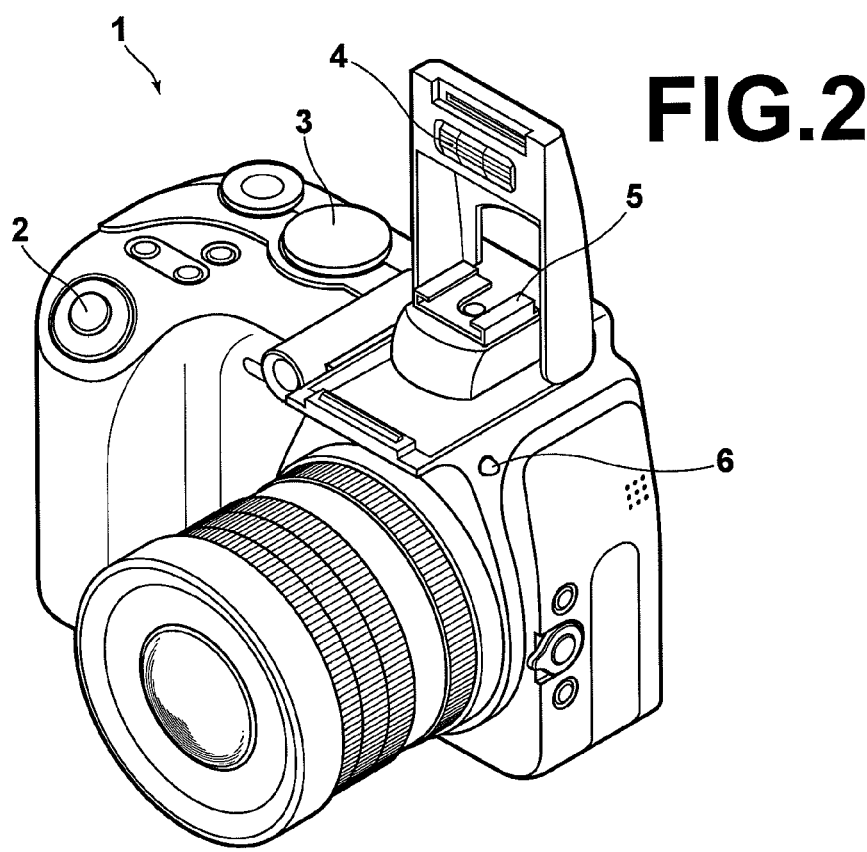
FIG. 2 is an overview of the digital camera according to one embodiment of the present invention (built-in flash popped-up state).
Figure 3:
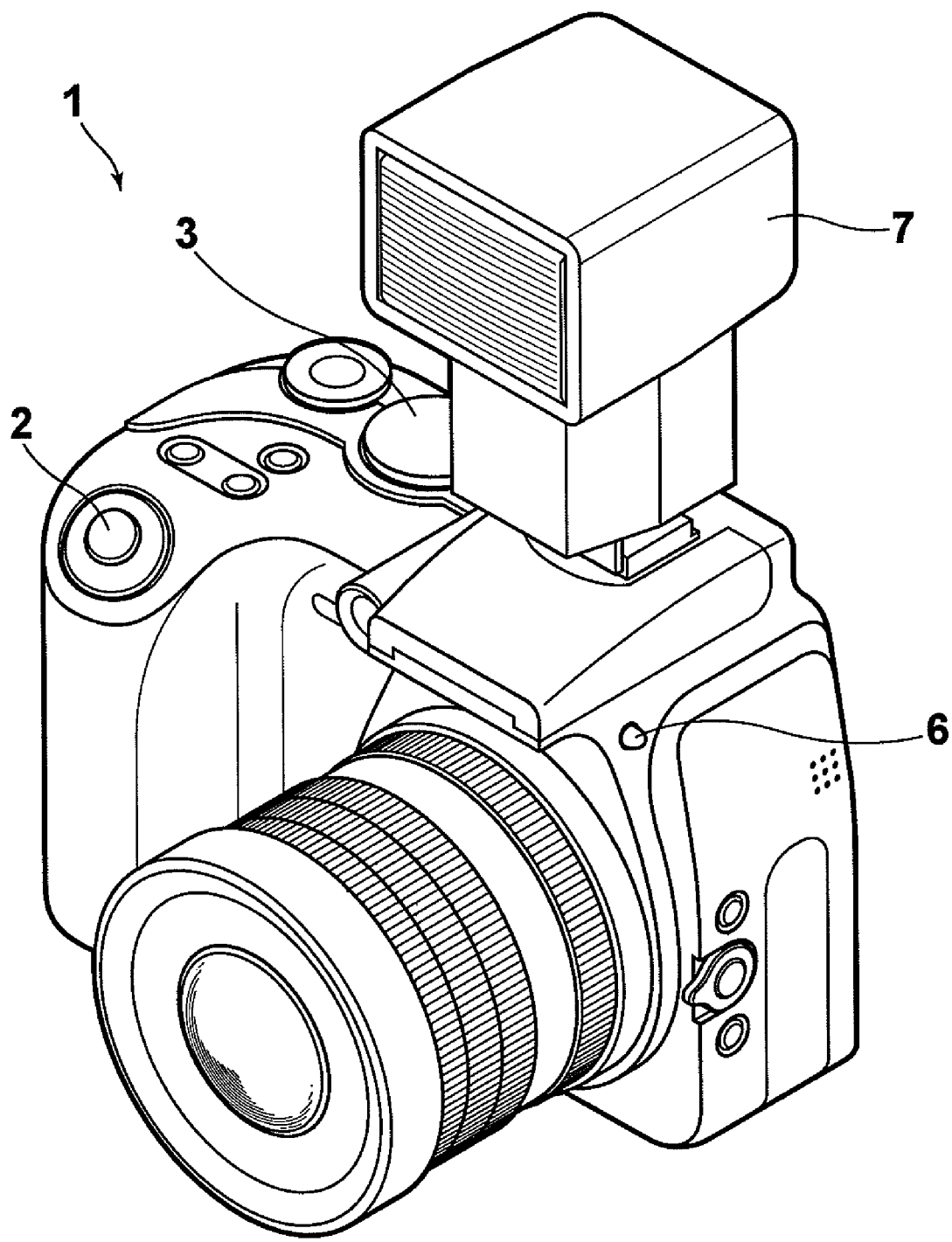
FIG. 3 is an overview of the digital camera according to one embodiment of the present invention (with an external flash mounted thereon).

FIGS. 1 to 3 illustrate overviews of the digital camera 1 according to one embodiment. As shown in FIG. 1, a release button 2, a mode dial 3 for setting photographing mode, a built-in flash 4, and a hot shoe 5, which is a bracket for mounting an accessory, are provided on the upper face of the digital camera 1.

The release button 2 has a structure that allows two types of operations to be instructed by two-step depressing operations of the button. For example, in a photographing operation using an automatic exposure function (AE) and an automatic focus function (AF), the digital camera 1 performs preparations for the photographing including exposure control, focusing, and the like when first depressing operation (halfway depression) is performed, in which the release button 2 is depressed lightly. Following this, if second depressing operation (full depression) is performed, in which the release button 2 is depressed strongly, the digital camera 1 initiates exposure and records image data of one frame obtained by the exposure to a memory card.

The built-in flash 4 opens up in upward (pops up) when a flash pop-up button 6 provided on a side thereof is depressed, as shown in FIG. 2. In a certain photographing mode, it sometimes pops up automatically. The popped up built-in flash 4 emits light two times in association with a second-step depressing operation. The first emission is preliminary emission (pre-emission) for measuring an amount of light reflected from a subject, and is very small in amount in comparison with that of a normal emission. The preliminary emission has another objective to prevent red-eye effects, in addition to measuring the reflected amount of light. The second emission is a main emission for supplying a sufficient amount of light to the subject (in order to obtain an appropriate amount of exposure) for the photographing. If the amount of light of the main emission is appropriate, an image with appropriate brightness may be obtained.

The operation of the built-in flash depends not only on the operation of the release button 2 but also on the photographing mode set by the mode dial 3. Photographing modes include "AUTO" in which all of the settings related to photographing are automatically performed by the camera, and "MANUAL" in which all of the settings related to photographing are manually performed by a user. In addition, various other photographing modes are provided for different photographing scenes, including "Program Auto", "Shutter Priority Auto", "Aperture Priority Auto", "Blur Reduction", "Natural Photo", "Portrait", "Landscape", "Nightscape", and the like. The digital camera 1 set to "AUTO" mode causes the built-in flash 4 to pop up automatically and to emit a flash in association with the operation of the release button 2 if it determines that flash photographing is required. On the other hand, "Natural Photo" is a non-flash photographing mode. Therefore, in the digital camera 1 set to this mode, the built-in flash 4 will not work even if the release button 2 is operated. For other modes, behavior of the built-in flash 4 that meets the purpose of each mode is defined.

It is noted that the digital camera 1 may also use an external flash 7 by attaching the flash to the hot shoe 5 as shown in FIG. 3. When attached to the hot shoe 5, the external flash 7 is mechanically and electrically connected to the digital camera 1. Thus, the external flash 7 emits light in association with the second depressing operation of the release button 2 according to the mode set through the mode dial 3, like the built-in flash 4. Hereinafter, a description will be made based mainly on the configuration illustrated in FIGS. 1 and 2. But the present invention is applicable regardless of whether the flash is built-in type or external type.

Figure 4:
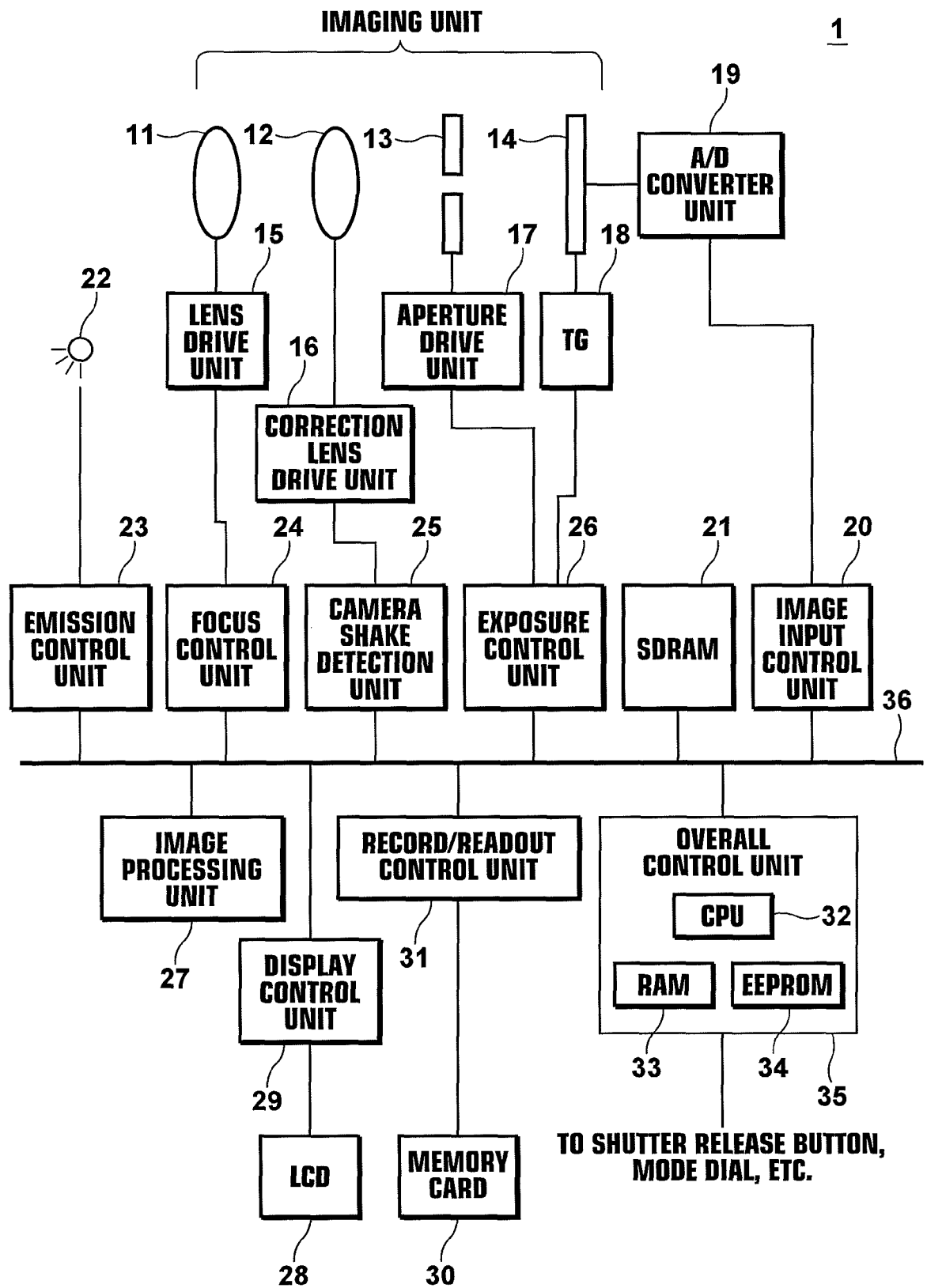
FIG. 4 illustrates an internal structure of the digital camera.

Referring now to FIG. 4, the internal configuration of the digital camera 1 will be described briefly. As shown in FIG. 4, the digital camera 1 includes a taking lens 11, a lens drive unit 15, a camera shake correction lens 12, a correction lens drive unit 16, an aperture 13, an aperture drive unit 17, a CCD 14, and a timing generator (TG) 18.

The taking lens 11 includes a plurality of functional lenses, such as a focus lens for bringing a subject into focus, a zoom lens for realizing a zoom function and the like. The lens drive unit 15 includes a small motor, such as a stepping motor or the like, and adjusts the position of each functional lens such that the distance from the CCD 14 to each functional lens meets the purpose of each functional lens.

Figure 5:
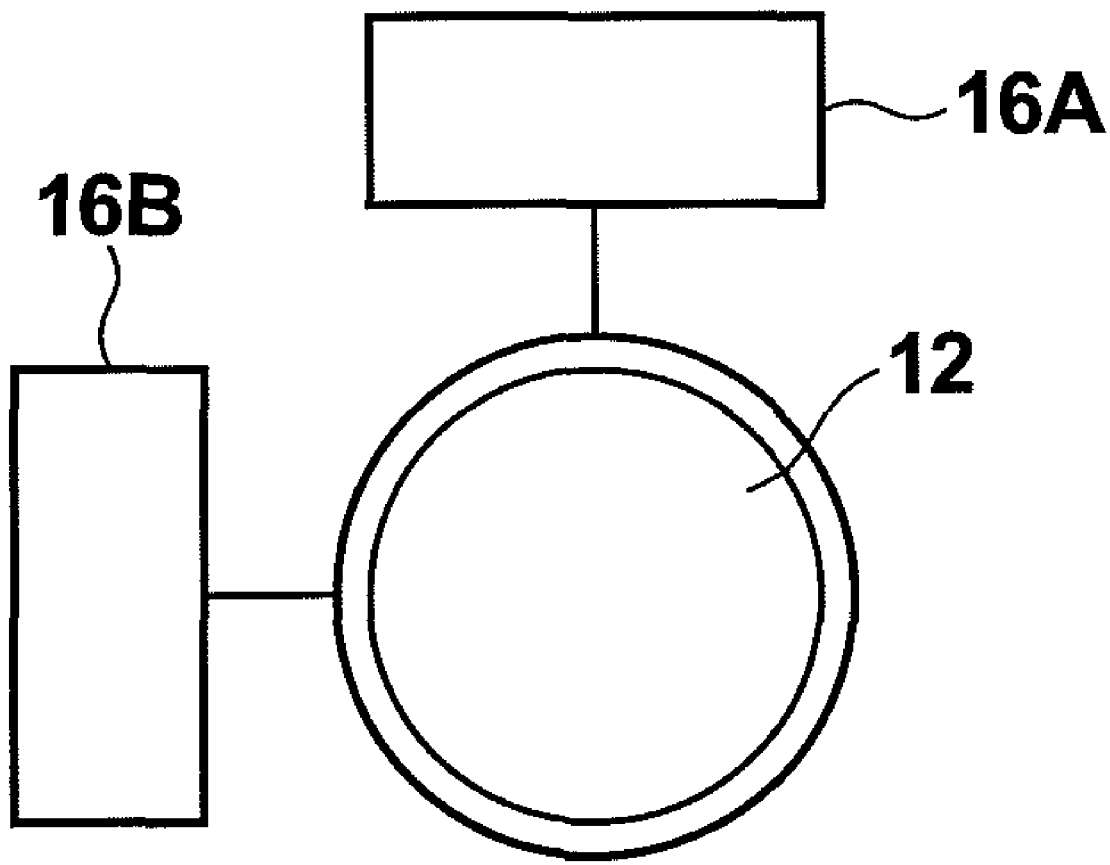
FIG. 5 illustrates a schematic configuration of a camera shake correction lens and correction lens drive unit.

FIG. 5 illustrates a schematic configuration of the camera shake correction lens 12 and the correction lens drive unit 16. The camera shake correction lens 12 is provided for correcting displacement of the optical axis caused by a camera shake, and constituted by a correction lens or a group of correction lenses. The correction lens drive unit 16 is constituted by a known x-direction lens drive unit 16A and a known y-direction lens drive unit 16B, each including a motor and a gear and drives the camera shake correction lens 12 in x-direction or y-direction which is orthogonal to the optical axis. This causes the camera shake correction lens 12 to be driven two-dimensionally on a plane orthogonal to the optical axis. It is noted that the camera shake correction lens 12 is driven with the position corresponding to the optical axis as the center of drive. Here, the camera shake correction lens 12 may be driven the most in every direction orthogonal to the optical axis when placed at the center of drive.

The aperture 13 includes a plurality of aperture fins. The aperture drive unit 17 includes a small motor, such as a stepping motor or the like, and adjusts the positions of the aperture fins so that the opening size of the aperture meets the purpose.

The CCD 14 is a CCD with primary color filters, and releases stored charges based on an instruction signal from the timing generator 18. The timing generator 18 sends a signal to the CCD 14 such that charges are stored in the CCD 14 only for a desired time, thereby controlling a shutter speed.

The digital camera 1 further includes an A/D converter unit 19 that converts output signals of the CCD 14 to digital signals, an image input control unit 20 that transfers the image data outputted from the A/D converter unit 19 to other processing units through the data bus 36, and a SDRAM 21 that tentatively stores the image data transferred from the image input control unit 20.

The digital camera 1 also includes a flash 22, an emission control unit 23 that controls the timing and amount of emission of the flash 22, a focus control unit 24 that brings the camera into focus by giving an instruction to move the lens to the lens drive unit 15, a camera shake detection unit 25, having an acceleration sensor or the like, that detects the amount of camera shake of the digital camera 1 and instructs drive amount and direction of the correction lens 12 to the correction lens drive unit 16 according to the detection result, and an exposure control unit 26 that determines the aperture value and shutter speed, and sends instruction signals to the aperture drive unit 17 and the timing generator 18.

The emission control unit 23, focus control unit 24, and exposure control unit 26 perform processing by referring to the image data stored in the SDRAM 21.

In addition, the digital camera 1 includes an image processing unit 27 that performs image processing on the image data stored in the SDRAM 21. The image processing unit 27 performs various types of finish processing for improving the appearance of the image, such as color tone correction and brightness correction to cause the image to have natural color tone and brightness and correction of a red-eye to a black eye if included in the image data, and stores the processed imaged data in the SDRAM 21 again.

The digital camera 1 further includes a display control unit 29 that controls output of the image data stored in the SDRAM 21 to a liquid crystal monitor 28. The display control unit 29 skips the number of pixels of the image data stored in the SDRAM 21 so as to become an appropriate size for display and outputs the image data to the liquid crystal monitor 28.

The digital camera 1 also includes a record/readout control unit 31 that controls recording of the image data stored in the SDRAM 21 to a memory card 30 and loading of image data stored in the memory card 30 to the SDRAM 21. The record/readout control unit 31 records RAW data directly or after converting to JPEG data by compression coding to the memory card 30 according to user setting. When loading JPEG data, the data are loaded in the SDRAM 21 after inversely converted by the record/readout control unit 31.

In addition to the above, the digital camera 1 further includes an overall control unit 35 constituted by a CPU (Central Processing Unit) 32, a RAM (Random Access Memory) 33 storing a manipulation/control program, and an EEPROM (Electrically Erasable and Programmable Read Only Memory) 34 storing various types of setting values. The overall control unit 35 detects a setting operation of photographing mode through the mode dial and other various types of user setting operations, and causes setting contents to be stored in the EEPROM 34. Then, when an operation determined by the setting operation or a photographing operation is performed, the overall control unit 35 sends signals instructing to perform processing and the performance timing of the processing to the image input control unit 20, emission control unit 23, focus control unit 24, camera shake detection unit 25, exposure control unit 26, image processing unit 27, display control unit 29, and record/readout control unit 31 through the system bus 36 according to the determined value stored in the EEPROM 34.

Figure 6:
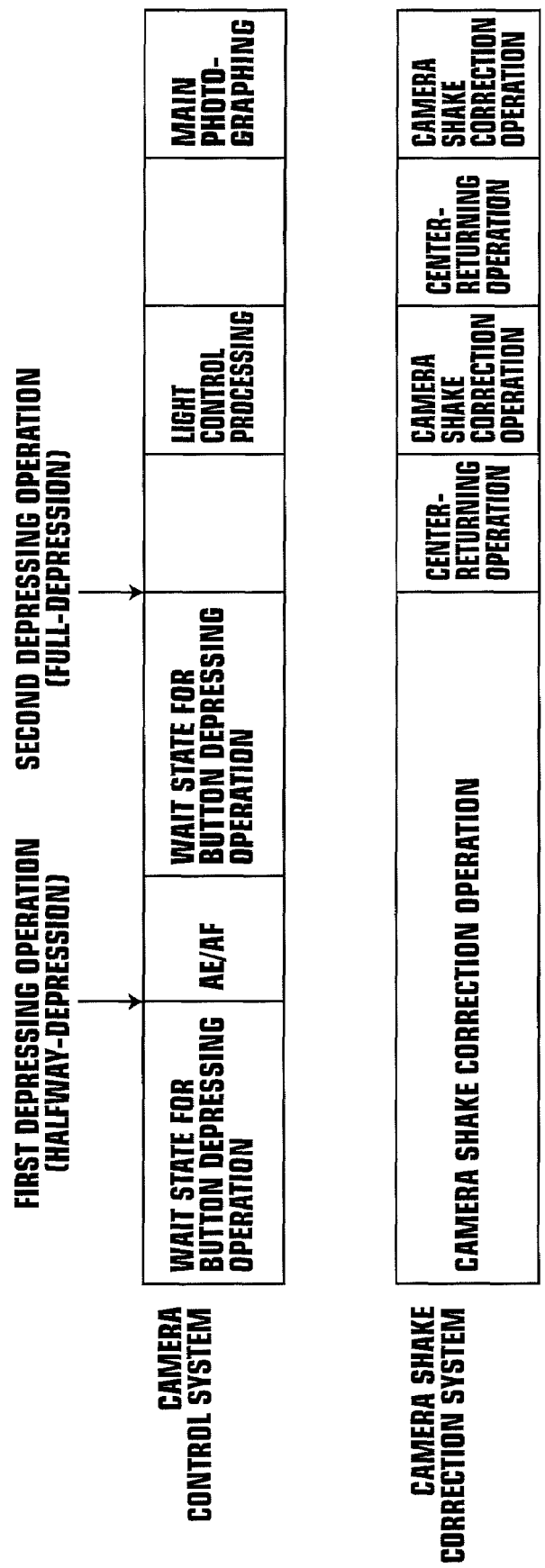
FIG. 6 illustrates operations of a camera control system and a camera shake correction system arranged in time series from left to right in a first embodiment (part 1).
Figure 7:
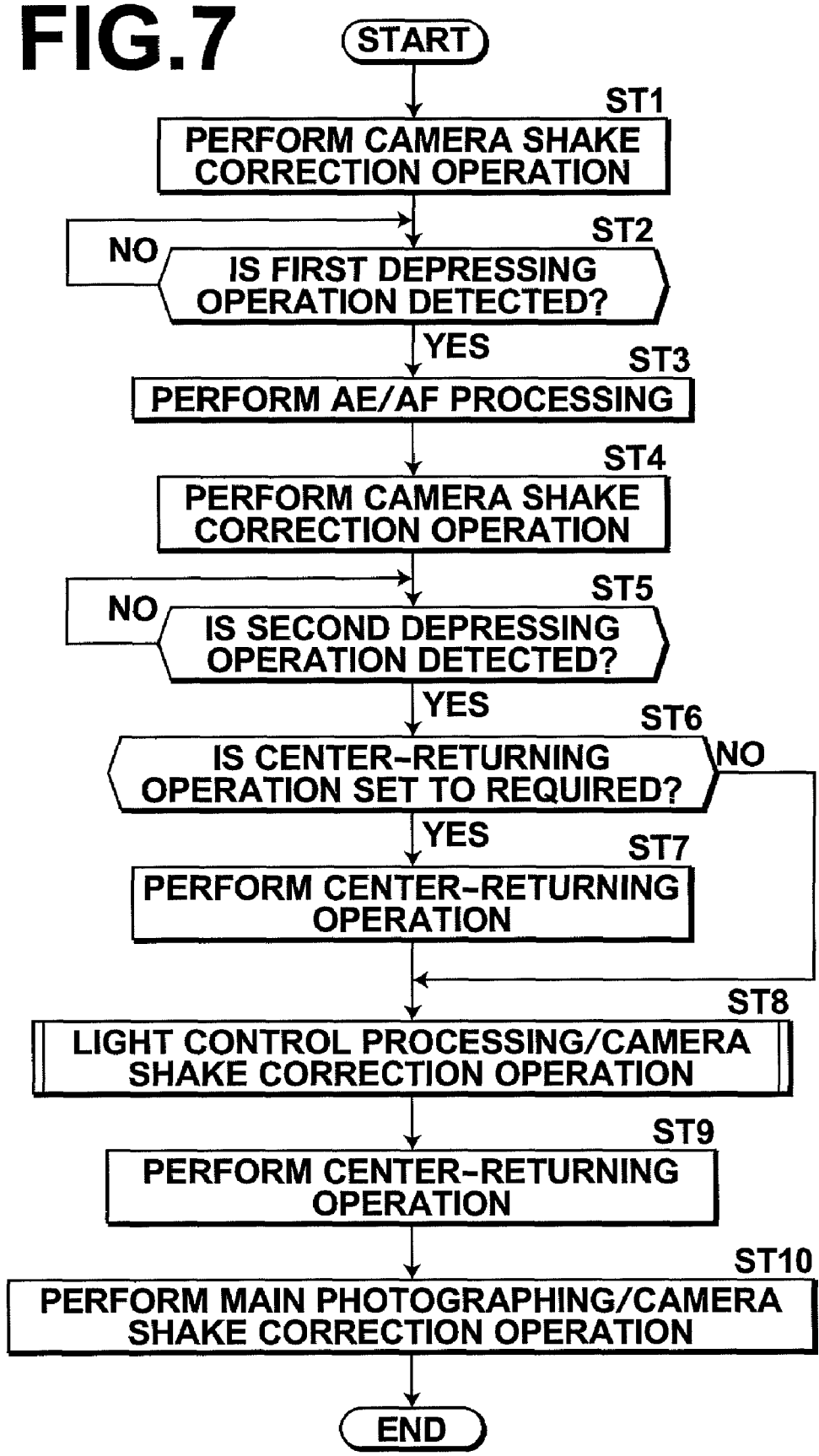
FIG. 7 is a flowchart illustrating processing performed in the first embodiment.

Hereinafter, drive control of the camera shake correction lens 12 by the correction lens drive unit 16 will be described in more detail in conjunction with emission control of the flash 22. FIG. 6 illustrates operations, arranged in time series from left to right, of a camera control system and a camera shake correction system (i.e., the camera shake correction lens 12 and correction lens drive unit 16) of the digital camera when a camera shake correction function and an emission control function according to a first embodiment are enabled. That is, in the digital camera 1 according to the first embodiment, it illustrates the relationship between the operation of the release button and the operation of the digital camera 1, and the relationship between the operation of the release button and the operation of the camera shake correction system. FIG. 7 is a flowchart illustrating processing performed in the first embodiment.

When one of the setting values in the EEPROM indicating whether or not camera shake correction is required is set to a value representing "required", the overall control unit 35 sends a signal to the camera shake detection unit 25 instructing to perform camera shake correction processing. In response to the instruction signal, the camera shake detection unit 25 initiates camera shake detection processing, and instructs the drive amount and direction of the camera shake correction lens 12 to the correction lens drive unit 16. This causes the correction lens drive unit 16 to perform an camera shake correction operation by driving the camera shake correction lens 12 (step ST1). The camera control system enters into a wait state for a depressing operation of the release button.

When first depressing operation (halfway depression) of the release button 2 is detected (step ST2: positive), the overall control unit 35 sends a notification signal to the focus control unit 24 and exposure control unit 26 notifying that the first depressing operation is detected. Upon receipt of the notification signal, the exposure control unit 26 performs AE processing and the focus control unit 24 performs AF processing (AE/AF processing, step ST3). Following step ST3, the camera shake correction operation is continuously performed (step ST4). The camera control system enters into a wait state for a depressing operation of the release button after the AE/AF processing.

Then, when second depressing operation (full depression) of the release button 2 is detected (step ST5: positive), the overall control unit 35 determines whether or not one of the setting values stored in the EEPROM, which indicates whether or not the camera shake correction lens 12 needs to be returned to the center of drive, is set to a value representing "required" (step ST6). If step ST6 is positive, the camera shake detection unit 25 instructs the correction lens drive unit 16 to return the camera shake correction lens 12 to the center of drive based on an instruction from the overall control unit 35, thereby the camera shake correction lens 12 is returned to the center of drive (center-returning operation, step ST7). It is noted that position information of the center of drive is stored in the EEPROM 34 in advance. If step ST6 is negative, the processing proceeds to step ST8.

In the mean time, the emission control unit 23 performs light control exposure and light control calculation (hereinafter, light control processing) (step ST8). It is noted that the camera shake correction operation is performed continuously during the light control processing.

Figure 8:
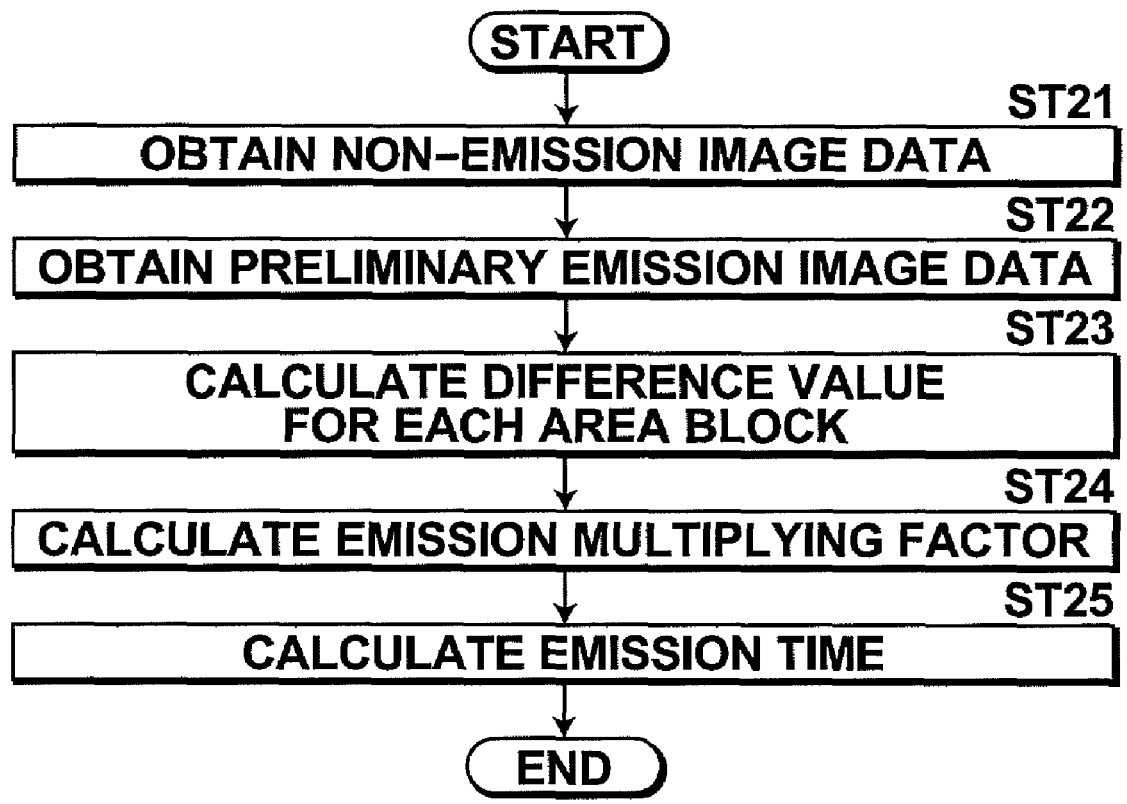
FIG. 8 is a flowchart of light control processing.

FIG. 8 is a flowchart of the light control processing. When an instruction signal to initiate the light control processing is sent to the emission control unit 23 from the overall control unit 35, the emission control unit 23 obtains an image photographed by non-emission exposure, that is, most recent image data stored in the SDRAM 21 (non-emission image data) (step ST21). Further, the emission control unit 23 causes preliminary emission to be performed, and obtains image data photographed by the preliminary emission exposure and stored in the SDRAM 21 (preliminary emission image data) (step ST22).

Figures 9, 10:
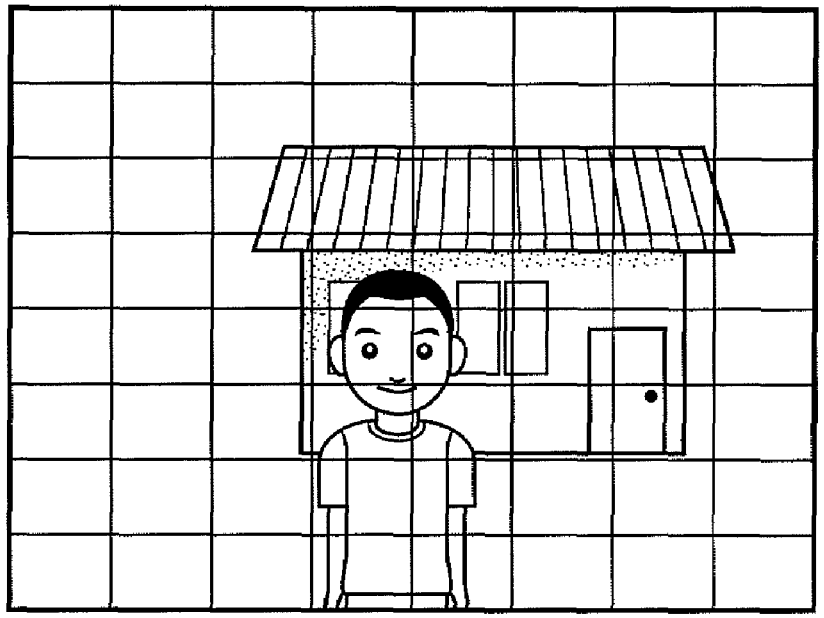
FIG. 9 illustrates an example of divided area blocks.
FIG. 10 illustrates weighting factors of the respective area blocks.

Next, the emission control unit 23 divides the obtained non-emission image data and preliminary emission image data into a plurality of area blocks, and calculates a difference value with respect to each area block between the non-emission image data and preliminary emission image data (step ST23). FIG. 9 illustrates an example of divided area blocks, in which image data 50 (non-emission image data or preliminary emission image data) are divided into n×m (here, 8×8) area blocks. In the description below, area blocks of different positions will be identified by reference symbols of (1, 1), (n, m), and the like.

Then, the emission control unit 23 obtains non-emission luminance information Ya (1, 1) to Ya (n, m) of the respective area blocks of the non-emission image data. For example, a RGB-YCC conversion is performed on the non-emission image data to obtain a luminance value of each pixel, and an average value of pixel luminance values is obtained with respect to each area block, which is used as the non-emission luminance information Ya. For the preliminary emission image data, luminance information Yb (1, 1) to Yb (n, m) of the respective area blocks are obtained in the similar manner as described above. Thereafter, with respect to each of the area blocks, the emission control unit 23 calculates a difference value Yd (x, y) (=Yb (x, y)−Ya (x, y)) between the non-emission image data Ya (x, y) and the preliminary emission image data Yb (x, Y). It is noted that the difference value Yd (x, y) serves as reflection luminance information.

Then, based on the difference values Yd (1, 1) to Yd (n, m) of all of the area blocks, an emission multiplying factor of emission amount of flash with respect to the preliminary emission is obtained (step ST24). For example, simple averages of the difference values Yd (1, 1) to Yd (n, m) and non-emission luminance information Ya (1, 1) to Ya (n, m), or weighted averages Ydm and Yam are calculated. Then, an emission multiplying factor with respect to the preliminary emission required for obtaining a target luminance value Yo is calculated using formula (1) below.

$$\text{Emission multiplying factor} = (Yo - Yam)/Ydm \quad (1)$$

When obtaining the weighted averages, for example, a greater weight is allocated to an area block located close to the center of the image, as shown in FIG. 10.

Further, the emission control unit 23 calculates an emission time of the flash 22 (step ST25), which concludes the light control processing. Here, the light emission characteristic differs depending on the type of luminous tube of the flash 22, so that the emission time is calculated by referring to a lookup table that associates emission time with emission multiplying factor provided in advance.

Returning now to FIG. 7, when the light control processing is completed, the camera shake detection unit 25 instructs the correction lens drive unit 16 to return the camera shake correction lens 12 to the center of drive, based on an instruction from the overall control unit 35, thereby the camera shake correction lens 12 is returned to the center of drive (center-returning operation, step ST9). Then, the overall control unit 25 causes a main photographing operation to be performed (step ST10). During this period, the camera shake correction operation is performed continuously.

In the main photographing operation, flash emission (main emission) and image acquisition are performed in synchronization with each other under instruction of the overall control unit 35. The emission control unit 23 causes the flash 22 to emit light at a timing instructed by the overall control unit 35 with the emission multiplying factor with respect to the preliminary emission and emission time determined by the light control processing. At the same timing, the exposure control unit 26 conveys the aperture value and shutter speed determined in step ST3 to the aperture drive unit 17 and timing generator 18, and the image input control unit 20 transfers image data supplied from the A/D converter unit 19 to the record/readout control unit 31, which in turn records the image data to the memory card 30. Thereby the photographing is completed.

As described above, in the first embodiment, when performing light control exposure, the camera shake correction lens 12 is returned to the center of drive prior to the light control exposure period, and the camera shake correction lens 12 is returned to the center of drive after the light control exposure. This allows the camera shake correction lens 12 to be driven maximally in any direction within the drive range before light control exposure and before main photographing. Thus, camera shake correction may be performed efficiently at the time of light control exposure and main photographing.

Further, if the camera shake correction lens 12 is not placed at the center of drive when the release button 2 is fully depressed, the camera shake correction lens 12 is driven to the center of drive, so that the camera shake correction lens 12 may be driven always from the center of drive at the time of light control exposure.

In the first embodiment, it is desirable that the timing of returning the camera shake correction lens 12 to the center of drive is immediately before light control exposure and main photographing, but not limited to this. The returning timing may be any timing as long as it is before an arbitrary timing during the light control exposure and the main photographing.

Figure 11:
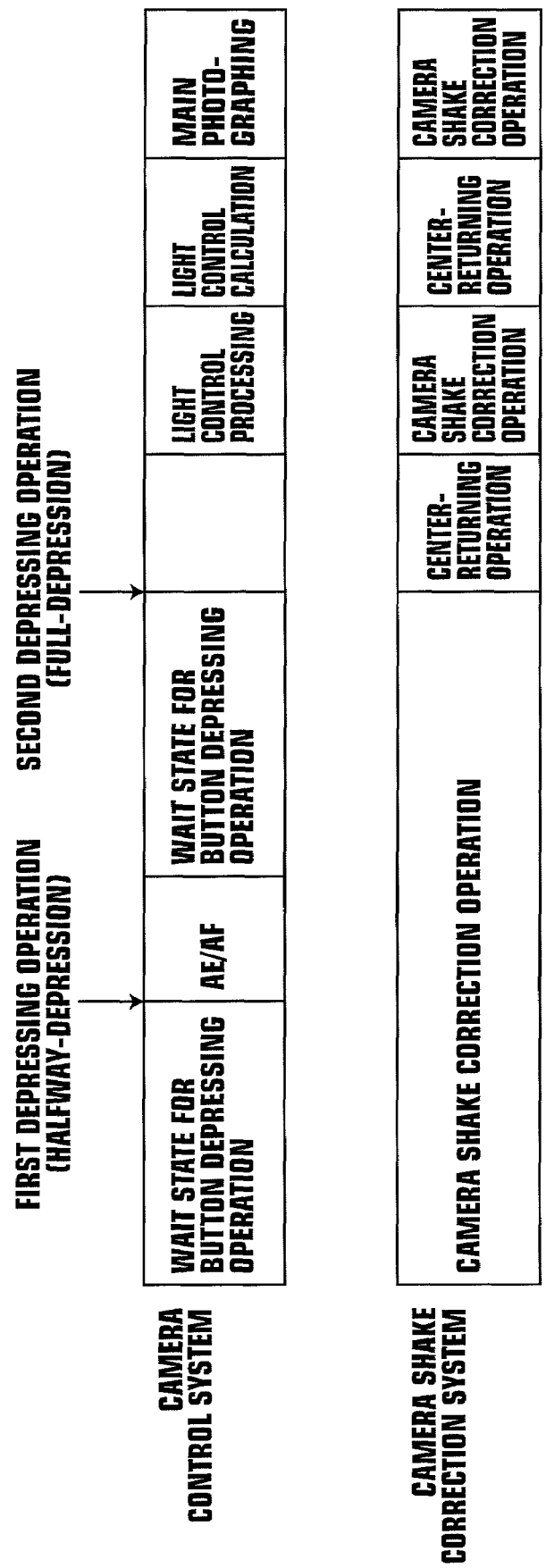
FIG. 11 illustrates operations of a camera control system and a camera shake correction system arranged in time series from left to right in a first embodiment (part 2).

Further, in the first embodiment, the camera shake correction lens 12 is driven to the center of drive after light control processing. But, as shown in FIG. 11, an arrangement may be adopted in which the camera shake correction lens 12 is returned to the center of drive during light control calculation following light control exposure, since the camera shake correction is not required during the light control calculation following the light control exposure. This allows the camera shake correction lens 12 to be returned to the center of drive without affecting light control exposure and main photographing through the use of a period that does not require camera shake correction.

Next, a second embodiment of the present invention will be described. The structure of a digital camera according to the second embodiment is identical to that of the digital camera 1 according to the first embodiment and only the operation thereof is different, so that the structure will not be elaborated upon further here. In the second embodiment, the drive range of the camera shake correction lens 12 before the second depressing operation of the release button 2 is made narrower than after the second depressing operation.

Figure 12:
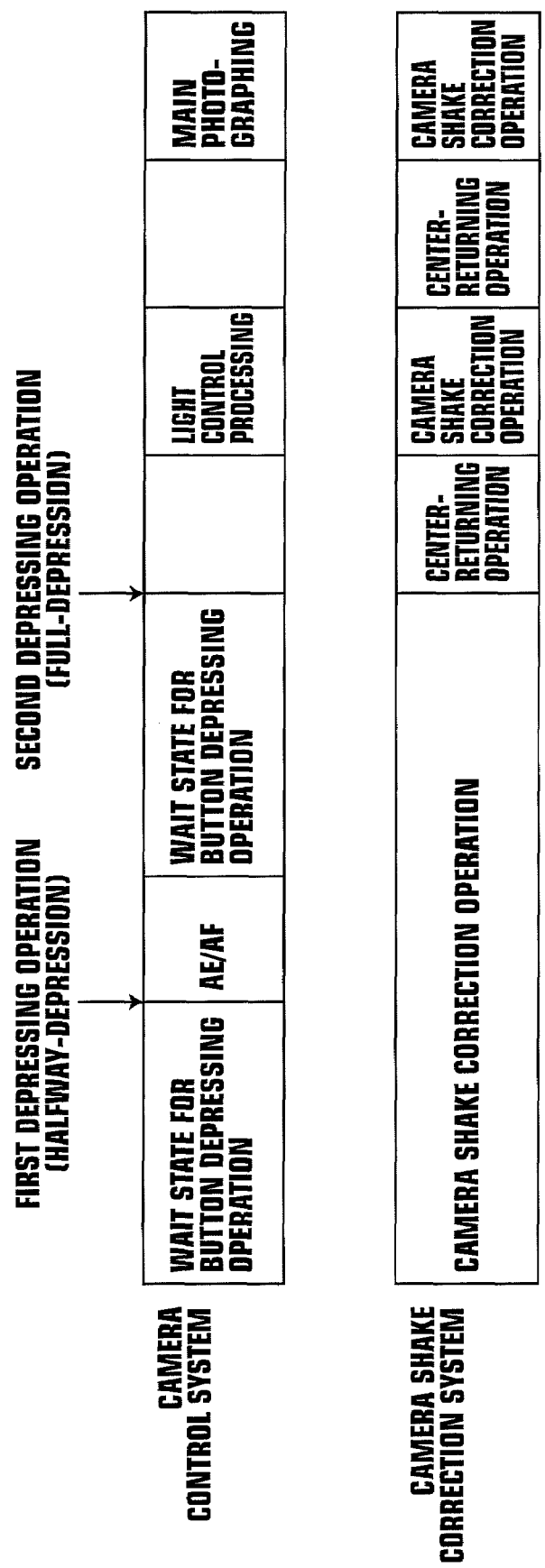
FIG. 12 illustrates operations of a camera control system and a camera shake correction system arranged in time series from left to right in a second embodiment.
Figure 13:
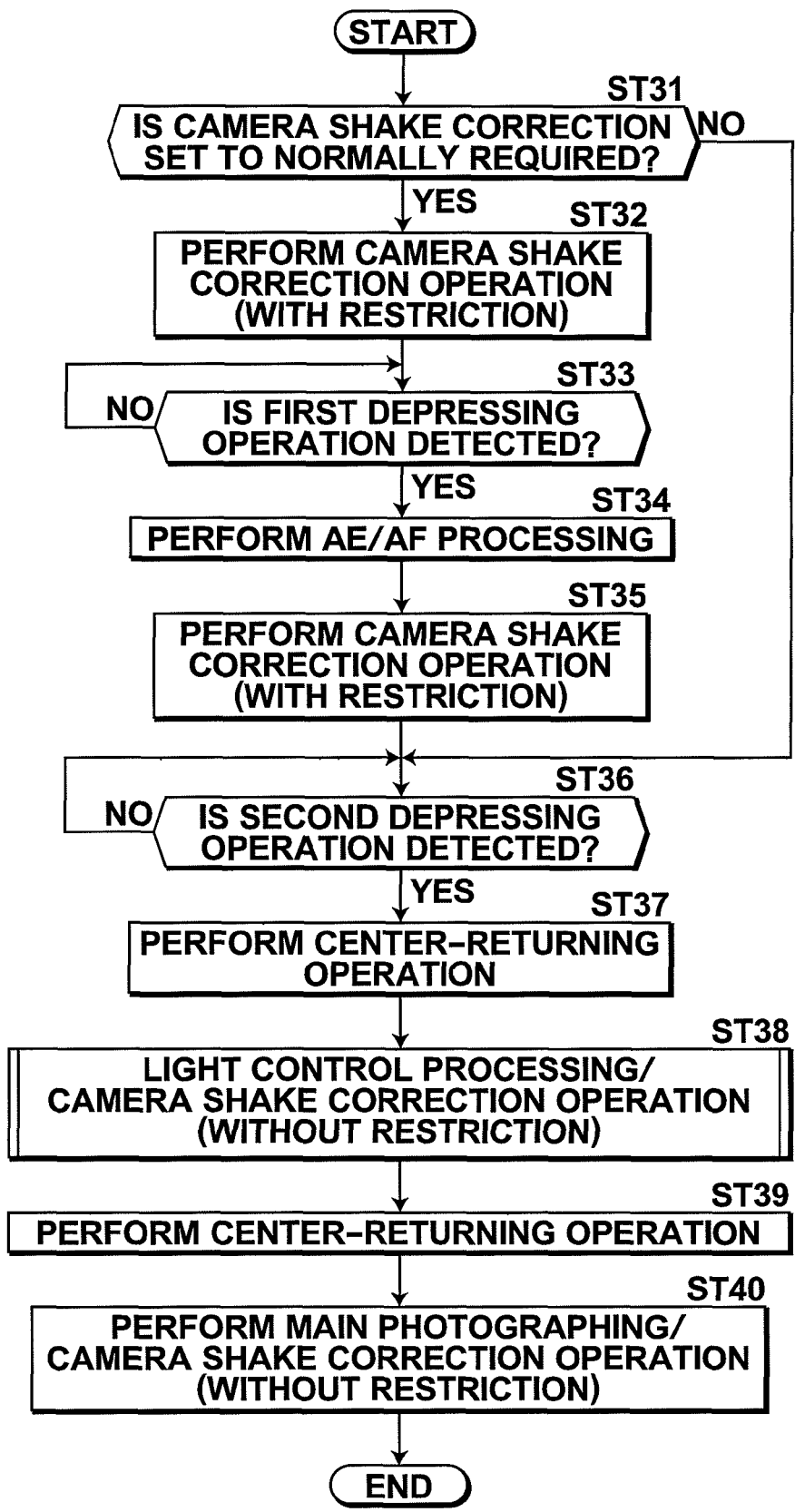
FIG. 13 is a flowchart illustrating processing performed in the second embodiment.

FIG. 12 illustrates operations of the camera control system and the camera shake correction system arranged in time series from left to right in the second embodiment. FIG. 13 is a flowchart illustrating processing performed in the second embodiment. In the second embodiment, it is assumed that the camera shake correction lens 12 is set to be returned to the center of drive after the second depressing operation of the release button 2.

When one of the setting values in the EEPROM indicating whether or not camera shake correction is required is set to a value representing normally "required" (step ST31, positive), the overall control unit 35 sends a signal to the camera shake detection unit 25 instructing to perform camera shake detection processing and drive processing of the correction lens drive unit 16. In response to the instruction signal, the camera shake detection unit 25 initiates the camera shake detection processing, and instruct the drive amount and direction of the camera shake correction lens 12 to the correction lens drive unit 16. This causes the correction lens drive unit 16 to perform an camera shake correction operation by driving the camera shake correction lens 12 (step ST32). The camera control system enters into a wait state for a depressing operation of the release button. If step ST31 is negative, the processing proceeds to step ST36.

Figure 14:
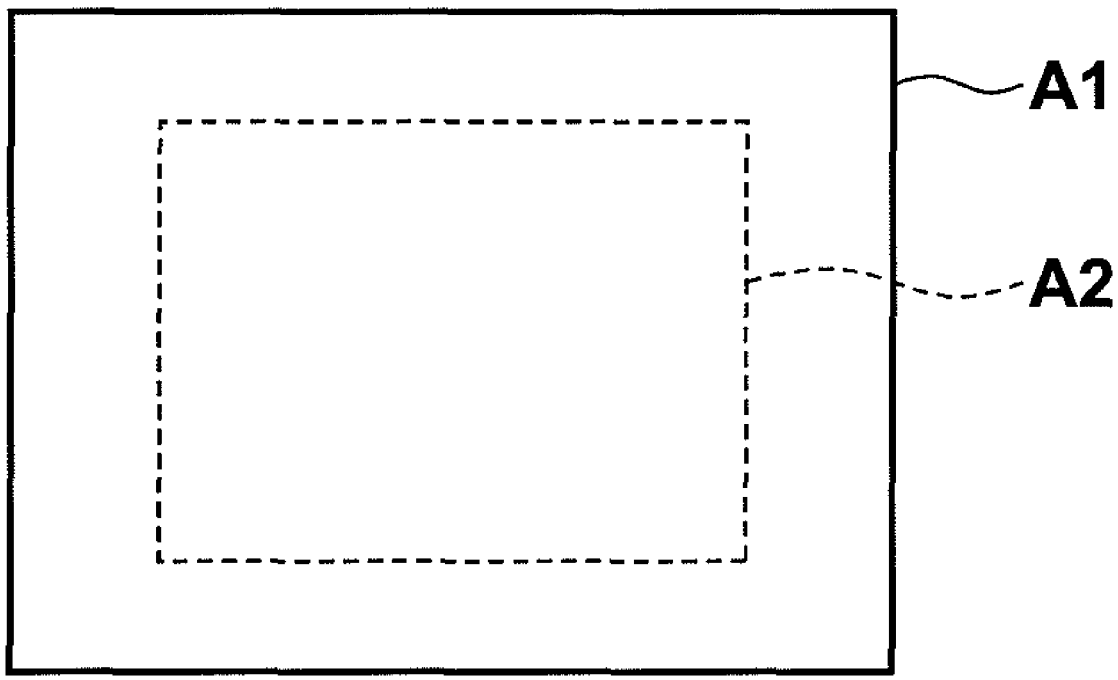
FIG. 14 illustrates a driving range of the camera shake control system in the second embodiment.

Here, the camera shake correction operation is restricted such that the drive range becomes narrower than that at the time of light control exposure and main photographing. For example, as shown in FIG. 14, if the drive range of the camera shake correction lens 12 at the time of light control exposure and main photographing is an area A1 indicated by a solid line, the drive range is restricted such that the camera shake correction lens 12 is driven only within an area A2 indicated by a dashed line.

Then, When first depressing operation (halfway depression) of the release button 2 is detected (step ST33: positive), the overall control unit 35 sends a notification signal to the focus control unit 24 and exposure control unit 26 notifying that the first depressing operation is detected. Upon receipt of the notification signal, the exposure control unit 26 performs AE processing and the focus control unit 24 performs AF processing (AE/AF processing, step ST34). Following step ST34, the camera shake correction operation is performed continuously (step ST35). Here, the camera shake correction operation is restricted as in step ST32. The camera control system enters into a wait state for a depressing operation of the release button after the AE/AF processing.

Then, when second depressing operation (full depression) of the release button 2 is detected (step ST36: positive), the camera shake detection unit 25 instructs the correction lens drive unit 16 to return the camera shake correction lens 12 to the center of drive based on an instruction from the overall control unit 35, thereby the camera shake correction lens 12 is returned to the center of drive (center-returning operation, step ST37).

In the mean time, the emission control unit 23 performs light control processing (step ST38). It is noted that the camera shake correction operation is performed continuously during the light control processing. In this case, the camera shake correction operation is not restricted, unlike steps ST32 and ST35.

When the light control processing is completed, the camera shake detection unit 25 instructs the correction lens drive unit 16 to return the camera shake correction lens 12 to the center of drive based on an instruction from the overall control unit 35, thereby the camera shake correction lens 12 is returned to the center of drive (center-returning operation, step ST39). Then, the overall control unit 35 causes a main photographing operation to be performed (step ST40), which concludes the processing. During the main photographing operation, the camera shake correction operation is performed continuously. In this case, the camera shake correction operation is not restricted, unlike steps ST32 and ST35.

As described above, in the second embodiment, the drive range of the camera shake correction lens 12 is restricted during a period from the time when the first operational instruction is received to the time when the second operational instruction is received. This allows the camera shake correction lens 12 to be returned promptly when the second operational instruction is received, which results in efficient camera shake correction at the time of light control exposure and main photographing.

In the second embodiment, the drive range of the camera shake correction lens 12 is restricted during a period from the time when the first operational instruction is received to the time when the second operational instruction is received by limiting the drive range narrower than that during the light control exposure and main photographing. The drive range may be restricted by lessening the amount of camera shake correction, that is, by lessening the drive amount of the camera shake correction lens 12 with respect to the camera shake.

Next, a third embodiment of the present invention will be described. The structure of a digital camera according to the third embodiment is identical to that of the digital camera 1 according to the first embodiment and only the operation thereof is different, so that the structure will not be elaborated upon further here. In the third embodiment, light control processing is performed after emitting red-eye reduction light for preventing red-eye effects.

Figure 15:
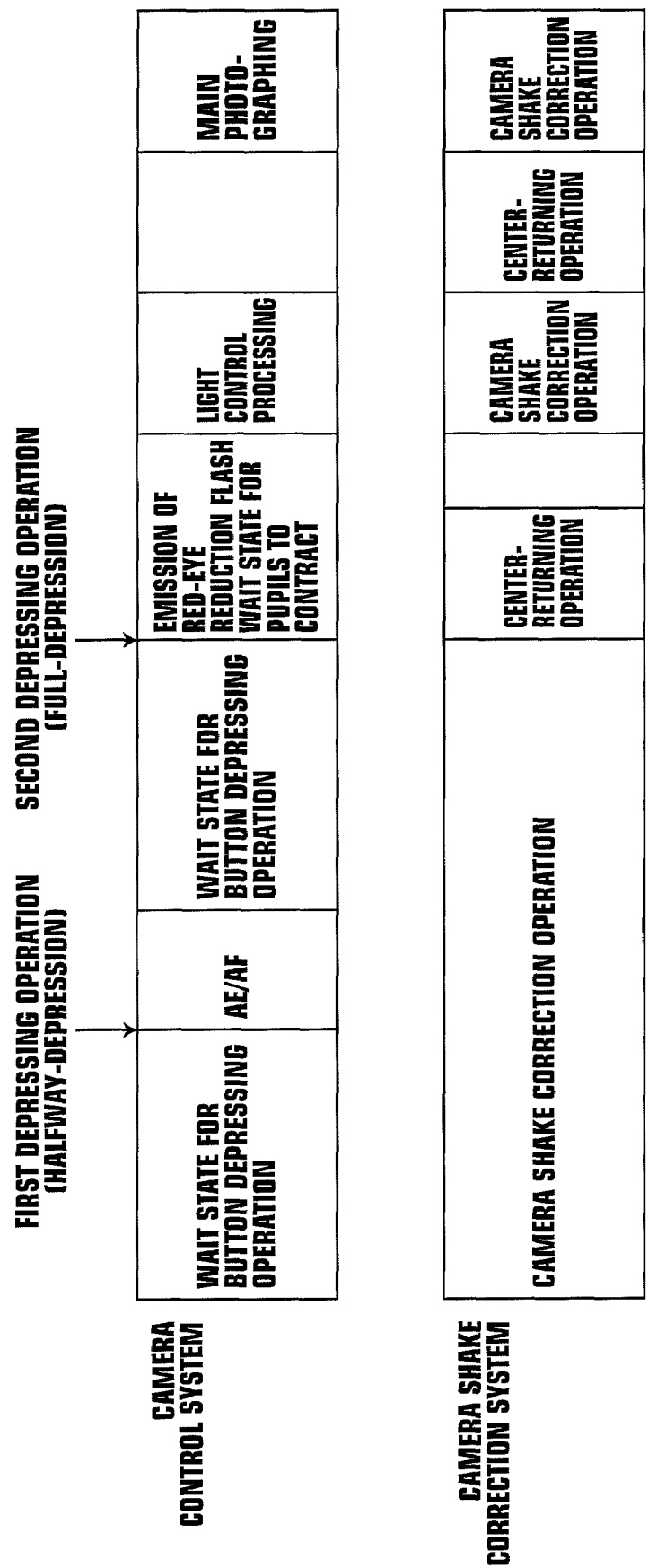
FIG. 15 illustrates operations of a camera control system and a camera shake correction system arranged in time series from left to right in a third embodiment.
Figure 16:
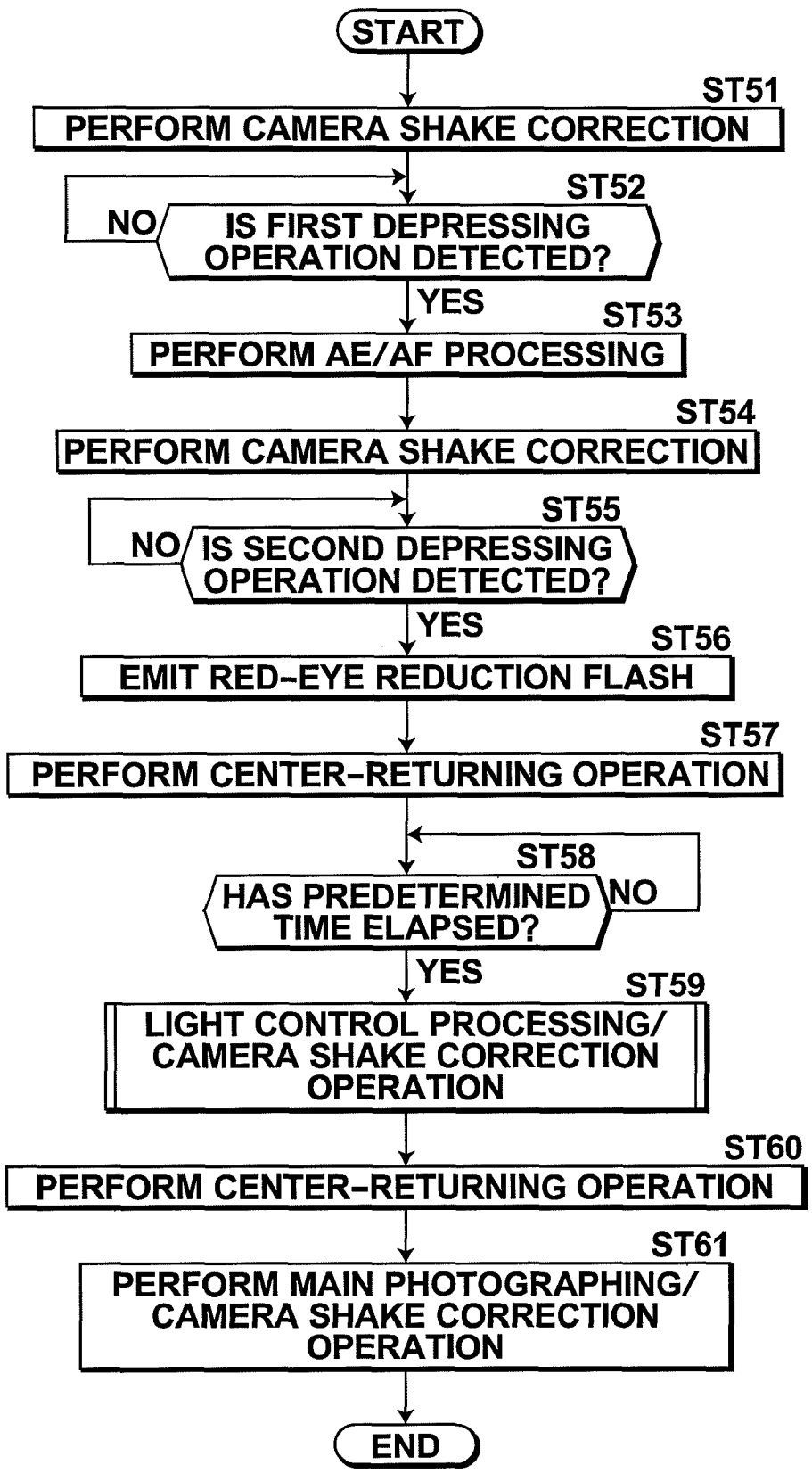
FIG. 16 is a flowchart illustrating processing performed in the third embodiment.

FIG. 15 illustrates operations of the camera control system and the camera shake correction system arranged in time series from left to right in the third embodiment. FIG. 16 is a flowchart illustrating processing performed in the third embodiment. Processing steps from ST51 to ST55 in the third embodiment are identical to processing steps from ST1 to ST5 in the first embodiment, so that they will not be elaborated upon further here. It is assumed here that the red-eye reduction function is being switched ON and the setting value thereof is recorded in the EEPROM 34. Also, in the third embodiment, it is assumed that the camera shake correction lens 12 is set to be returned to the center of drive after the second depressing operation of the release button 2.

If step ST55 is positive, the overall control unit 35 sends a signal to the emission control unit 23 instructing to emit red-eye reduction light based on the setting in the EEPROM 34 indicating that the red-eye reduction light emission function is being set to ON. Upon receipt of the instruction signal, the emission control unit 23 causes the flash 22 to emit light after setting the amount of the light to a prerecorded value for red-eye reduction. This results the red-eye reduction light to be emitted (step ST56).

Next, the camera shake detection unit 25 instructs the correction lens drive unit 16 to return the camera shake correction lens 12 to the center of drive, based on an instruction from the overall control unit 35, thereby the camera shake correction lens 12 is returned to the center of drive (center-returning operation, step ST57). Then, after a predetermined period elapses from the time when the red-eye reduction light is emitted to the time when pupils start contracting in response to the emitted red-eye reduction light (step ST58, positive), the emission control unit 23 performs light control processing (step ST59). The camera shake correction operation is performed continuously during the light control processing.

When the light control processing is completed, the camera shake detection unit 25 instructs the correction lens drive unit 16 to return the camera shake correction lens 12 to the center of drive based on an instruction from the overall control unit 35, thereby the camera shake correction lens 12 is returned to the center of drive (center-returning operation, step ST60). Then, the overall control unit 25 causes a main photographing operation to be performed (step ST61) and the processing is completed. During the main photographing operation, the camera shake correction operation is performed continuously.

As described above, in the third embodiment, the camera shake correction lens 12 is driven to the center of drive during the emission period of red-eye reduction light. This allows the camera shake correction lens 12 to be returned to the center of drive without affecting light control exposure and main photographing through the use of a period that does not require camera shake correction.

In the third embodiment, the camera shake correction lens 12 is driven to the center of drive during the emission period of red-eye reduction light. But an arrangement may be adopted in which the camera shake correction lens 12 is returned to the center of drive during a period after the emission of red-eye reduction light to the time when light control exposure is performed.

Next, a fourth embodiment of the present invention will be described. The structure of a digital camera according to the fourth embodiment is identical to that of the digital camera 1 according to the first embodiment and only the operation thereof is different, so that the structure will not be elaborated upon further here. In the fourth embodiment, when returning the camera shake correction lens 12 to the center of drive, a determination is made as to whether or not to return the camera shake correction lens 12 to the center of drive according to a current position of the camera shake correction lens 12.

Figure 17:
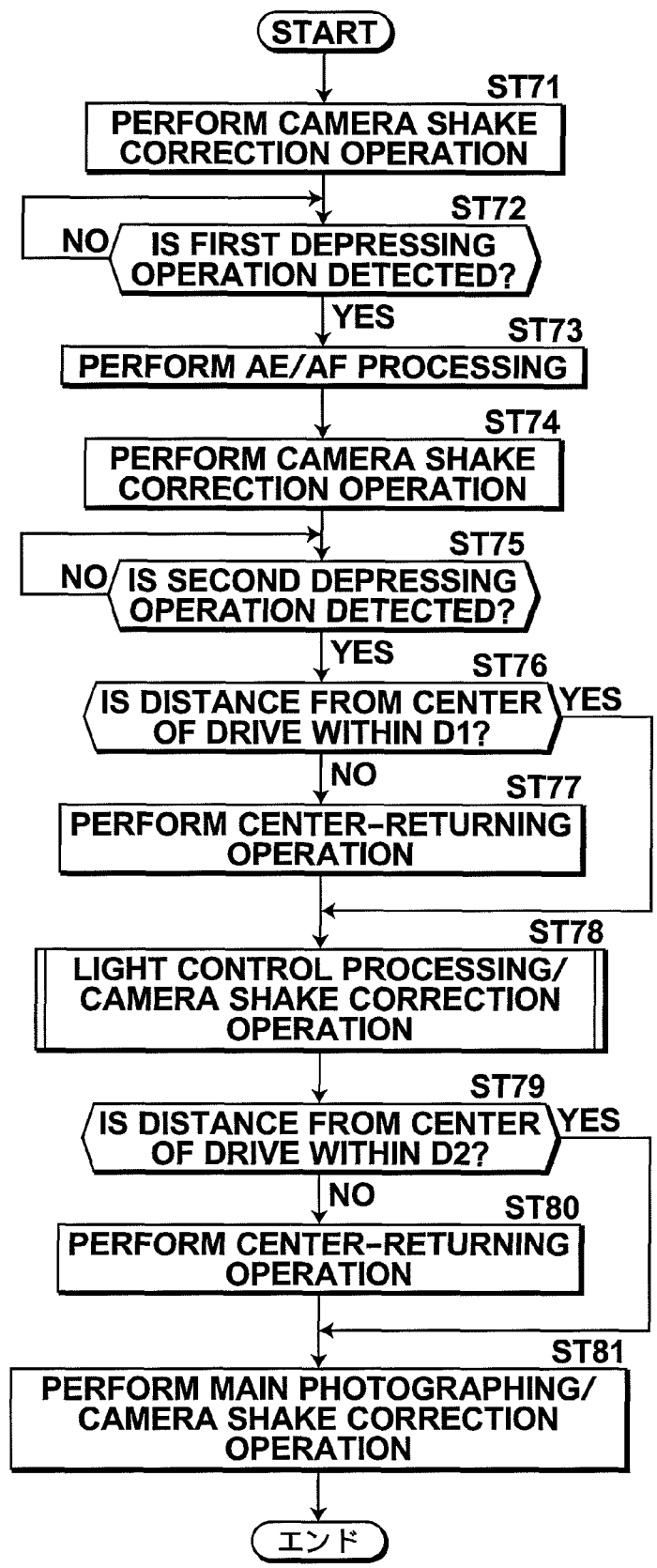
FIG. 17 is a flowchart illustrating processing performed in a fourth embodiment.

FIG. 17 is a flowchart illustrating processing performed in the fourth embodiment. The drawing illustrating operations of the camera control system and the camera shake correction system arranged in time series from left to right in the fourth embodiment is identical to FIG. 6 in the first embodiment, and hence omitted here. Further, processing steps from ST71 to ST75 in the fourth embodiment are identical to the processing steps from ST1 to ST5 in the first embodiment, so that they will not be elaborated upon further here.

If step ST75 is positive, the correction lens drive unit 16 determines whether or not the camera shake correction lens 12 is located within a distance D1 from the center of drive of the camera shake correction lens 12 (step ST76). The term "distance from the center of drive of the camera shake correction lens 12" as used herein means a distance from the center of drive of the optical axis of the camera shake correction lens 12.

If step ST76 is negative, the camera shake detection unit 25 instructs the correction lens drive unit 16 to return the camera shake correction lens 12 to the center of drive based on an instruction from the overall control unit 35, thereby the camera shake correction lens 12 is returned to the center of drive (center-returning operation, step ST77). If step ST76 is positive, the processing proceeds to step ST78 without returning the camera shake correction lens 12 to the center of drive. Then, the emission control unit 23 performs light control processing (step ST78). The camera shake correction operation is performed continuously during the light control processing.

When the light control processing is completed, the overall control unit 35 determines whether or not the camera shake correction lens 12 is located within a distance D2 from the center of drive (step ST79). If step ST79 is positive, the processing proceeds to step ST81 without returning the camera shake correction lens 12 to the center of drive. If step ST79 is negative, the camera shake detection unit 25 instructs the correction lens drive unit 16 to return the camera shake correction lens 12 to the center of drive based on an instruction from the overall control unit 35, thereby the camera shake correction lens 12 is returned to the center of drive (center-returning operation, step ST80). Then, the overall control unit 35 causes a main photographing operation to be performed (step ST81), which concludes the processing. The camera shake correction operation is performed continuously during the main photographing.

As described above, in the fourth embodiment, the camera shake correction lens 12 is not returned to the center of drive when the camera shake correction lens 12 is located within the distance D1 or D2. Therefore, when the camera shake correction lens 12 is located near the center of drive, the camera shake correction lens 12 is driven from that position without bothering to return it to the center of drive. Accordingly, wasteful drive of the camera shake correction lens 12 and wasteful power consumption may be prevented.

The distances D1 and D2 in the fourth embodiment may be the same or different, and in particular it is preferable that D2<D1. The reason is that the main photographing requires more accurate camera shake correction in comparison with the light control exposure.

In the first to fourth embodiments, the camera shake correction lens 12 is returned to the center of drive. But the camera shake correction lens 12 is not necessarily returned to the center of drive and may be returned to an arbitrary position adjacent to the center of drive. Further, the camera shake correction lens 12 is not necessarily returned to the same position prior to light control exposure and prior to main photographing, and may be returned to different positions adjacent to the center of drive. Returning control of the camera shake correction lens 12 may be performed easily by storing a coordinate value of a position to which the camera shake correction lens 12 is driven in the EEPROM 34 and driving the camera shake correction lens 12 with reference to the coordinate value.

Figures 18, 19:
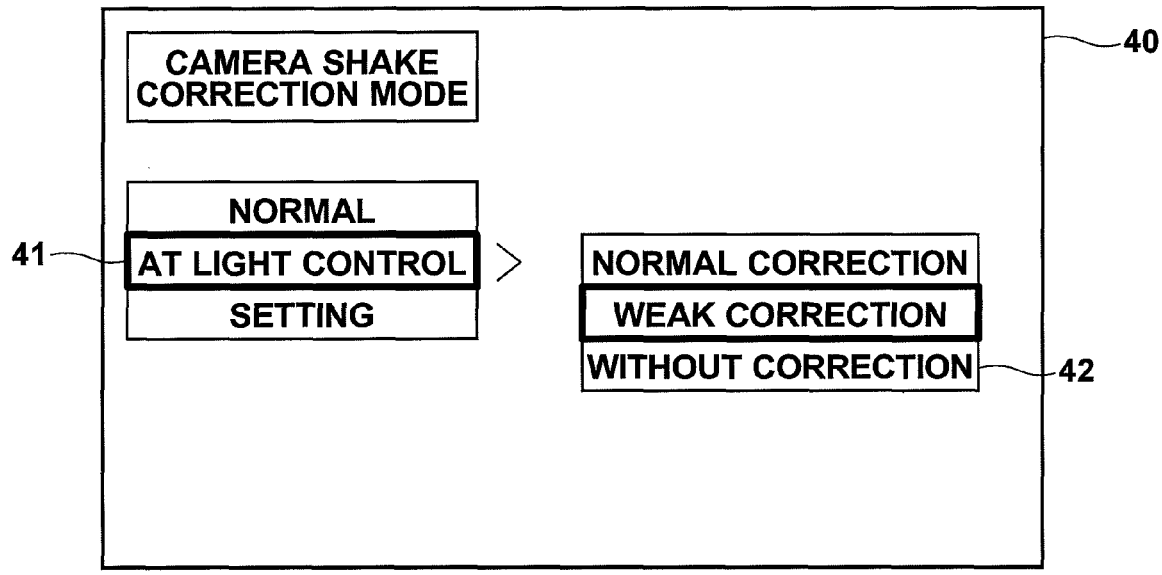
FIG. 18 illustrates an example of drive information (part 1).
FIG. 19 illustrates a setting screen of camera shake correction mode displayed on a monitor.

Further, in the first to fourth embodiments, an arrangement may be adopted in which drive information of the camera shake correction lens 12 is attached to image data of main photographing by the record/readout control unit 31. FIG. 18 illustrates an example of drive information. As shown in FIG. 18, the drive information includes information indicating whether or not the camera shake correction lens 12 is returned to the center of drive before and after light control exposure (Performed/Not Performed) and information indicating the returned position. Here, the returned position is the center of drive. The drive information maybe provided in any form as long as the drive information is described in text data having the same file name as image data, and the image data and drive information are inseparably integrated, as well as described in the tag of the image data.

By providing drive information to image data in the manner as described above, the image data may be processed appropriately by referring to the drive information at a later time. For example, if the returned position after light control exposure is not the center of drive, it is likely that the image is blurred by camera shake, so that image processing for removing the camera shake may be performed. Further, if the returned position before light control exposure is not the center of drive, it is likely that an emission amount of the flash 22 is not appropriate, so that image processing giving priority to adjusting image brightness and contrast may be performed.

Still further, in the first to fourth embodiments, the timing of returning the camera shake correction lens 12 to the center of drive is not limited to a time immediately after the second depressing operation of the release button 2. The timing of supplying the detection result may be set at a predetermined time point in advance.

Further, in the first to fourth embodiments, light control exposure is performed. But the light control exposure is not necessarily required, and digital cameras in which the camera shake correction lens 12 is returned to the center of drive prior to main photographing all belong to the technical scope of the present invention.

Next, a fifth embodiment of the present invention will be described. The structure of a digital camera according to the fifth embodiment is identical to that of the digital camera 1 according to the first embodiment and only the operation thereof is different, so that the structure will not be elaborated upon further here. In the fifth embodiment, it is assumed that camera shake correction mode for setting an camera shake correction operation at the time of light control processing, to be described later, is preset before photographing takes place. FIG. 19 illustrates a setting screen of camera shake correction mode displayed on the monitor 28. As shown in FIG. 19, the setting screen 40 for setting camera shake correction mode displays a selection command 41 for setting the timing when camera shake correction takes place (Normal, At Light Control, and Setting), and a selection command 42 for selecting the condition of camera shake correction control (Normal Correction, Weak Correction, and Without Correction). FIG. 19 shows that "At Light Control" is selected as the timing when camera shake correction takes place and "Weak Correction" is selected as the condition of control. The user selects the timing when camera shake correction takes place and condition of control in the setting screen 40, and, after the selections, selects "Setting". This causes setting values of the timing when camera shake correction takes place and the condition of control to be stored in the EEPROM 34.

Figure 20:
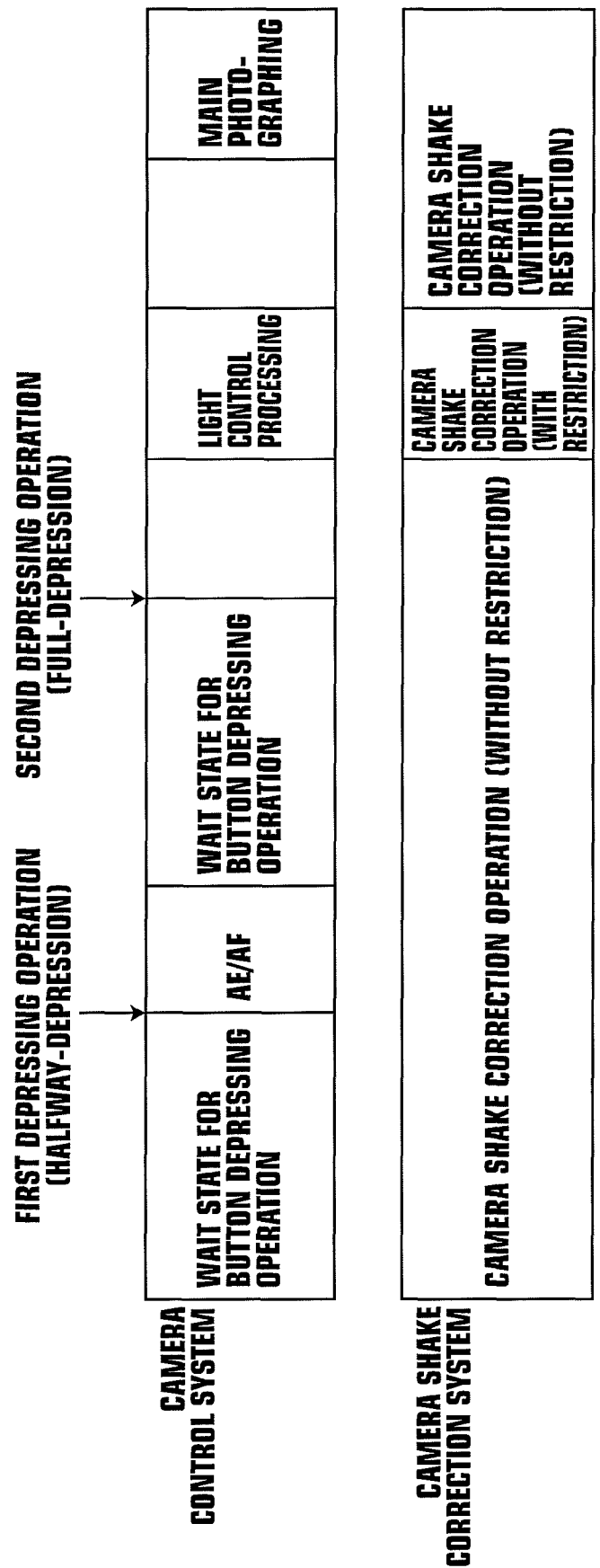
FIG. 20 illustrates operations of a camera control system and a camera shake correction system arranged in time series from left to right in a fifth embodiment.
Figure 21:
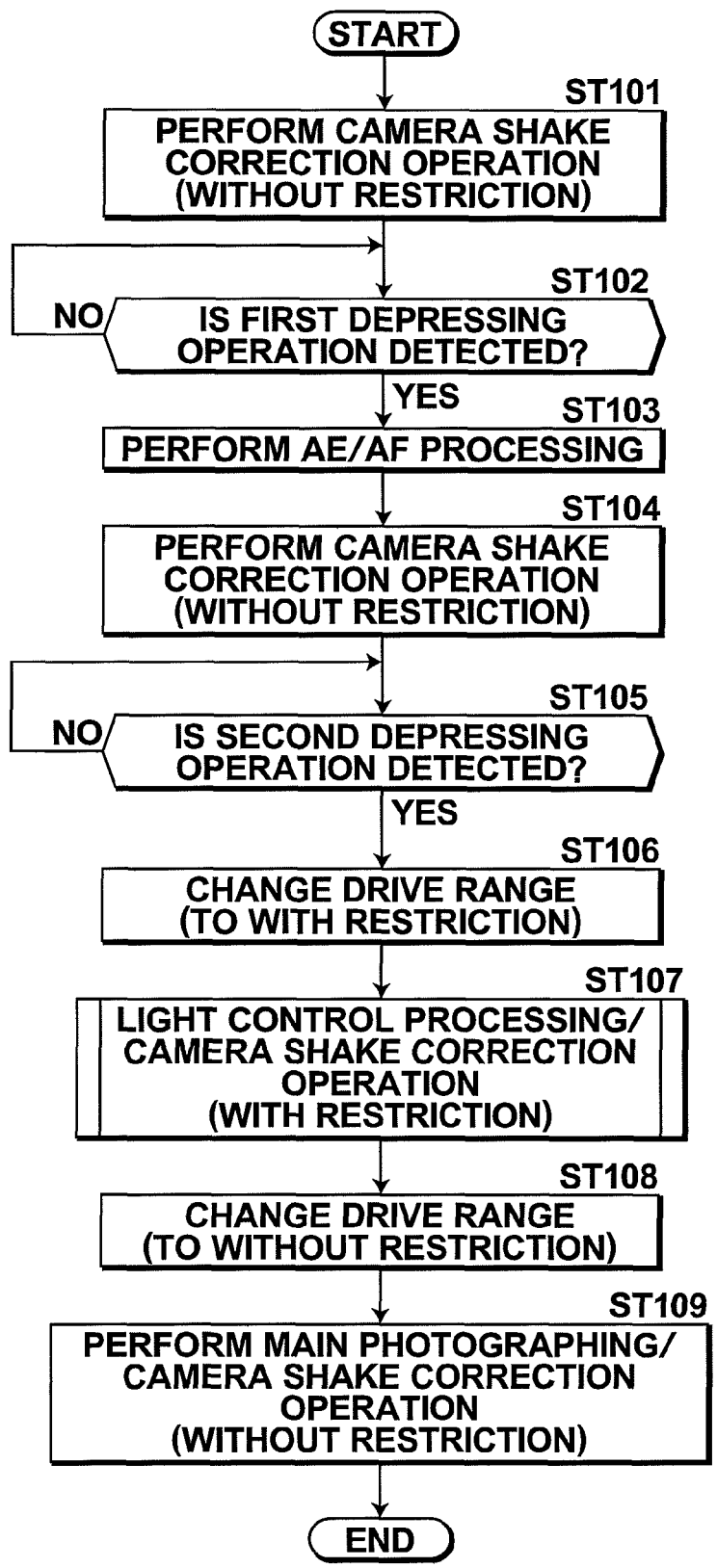
FIG. 21 is a flowchart illustrating processing performed in the fifth embodiment.

Hereinafter, drive control of the camera shake correction lens 12 by the correction lens drive unit 16 in the fifth embodiment will be described in more detail in conjunction with emission control of the flash 22. FIG. 20 illustrates operations, arranged in time series from left to right, of the camera control system and the camera shake correction system (i.e., the camera shake correction lens 12 and correction lens drive unit 16) of the digital camera when a camera shake correction function and an emission control function according to the fifth embodiment are enabled. That is, in the digital camera 1 according to the fifth embodiment, it illustrates the relationship between the operation of the release button and the operation of the digital camera 1, and the relationship between the operation of the release button and the operation of the camera shake correction system. FIG. 21 is a flowchart illustrating processing performed in the fifth embodiment. In the fifth embodiment, it is assumed that the camera shake correction mode is set such that weak camera shake correction is performed at the time of light control.

When one of the setting values in the EEPROM indicating whether or not camera shake correction is required is set to a value representing "required", the overall control unit 35 sends a signal to the camera shake detection unit 25 instructing to perform camera shake correction processing. In response to the instruction signal, the camera shake detection unit 25 initiates processing of camera shake detection and instructs the drive amount and direction of the camera shake correction lens 12 to the correction lens drive unit 16. This causes the correction lens drive unit 16 to perform an camera shake correction operation by driving the camera shake correction lens 12 (step ST101). The camera shake correction operation at this time is not restricted in any way in the drive range of the camera shake correction lens 12. The camera control system enters into a wait state for a depressing operation of the release button.

When first depressing operation (halfway depression) of the release button 2 is detected (step ST102: positive), the overall control unit 35 sends a notification signal to the focus control unit 24 and exposure control unit 26 notifying that the first depressing operation is detected. Upon receipt of the notification signal, the exposure control unit 26 performs AE processing and the focus control unit 24 performs AF processing (AE/AF processing, step ST103). Following step ST103, the camera shake correction operation is continuously performed (step ST104). Here also, the camera shake correction operation is not restricted in any way in the drive range of the camera shake correction lens 12.The camera control system enters into a wait state for a depressing operation of the release button after the AE/AF processing.

Then, when second depressing operation (full depression) of the release button 2 is detected (step ST105: positive), the overall control unit 35 instructs the camera shake detection unit 25 to change the drive range of the camera shake correction lens 12 so that the range is restricted based on the setting of "Weak Correction". This causes the drive range of the camera shake correction lens 12 to be changed to "with restriction" (step ST106). For example, as shown in FIG. 14, if the drive range of the camera shake correction lens 12 without restriction is an area A1 indicated by a solid line, the drive range is restricted such that the camera shake correction lens 12 is driven only within an area A2 indicated by a dashed line.

Then, the emission control unit 23 performs light control exposure and light control calculation (hereinafter, light control processing) (step ST107). It is noted that the camera shake correction operation is performed continuously during the light control processing but the drive range is restricted.

When the light control processing is completed, the overall control unit 35 instructs the camera shake detection unit 25 to change the drive range of the camera shake correction lens 12 to that without restriction. This causes the drive range of the camera shake correction lens 12 to be changed to that without restriction (step ST108). Then, the overall control unit 35 causes a main photographing operation to be performed (step ST109). During this period, the camera shake correction operation is performed continuously.

In the main photographing operation, flash emission (main emission) and image acquisition are performed in synchronization with each other under instruction of the overall control unit 35. The emission control unit 23 causes the flash 22 to emit light at a timing instructed by the overall control unit 35 with the emission multiplying factor with respect to the preliminary emission and emission time determined by the light control processing. At the same timing, the exposure control unit 26 conveys the aperture value and shutter speed determined in step ST103 to the aperture drive unit 17 and timing generator 18, and the image input control unit 20 transfers image data supplied from the A/D converter unit 19 to the record/readout control unit 31, which in turn records the image data to the memory card 30. Thereby the photographing is completed.

As described above, in the fifth embodiment, the drive range of the camera shake correction lens 12 is restricted during light control exposure by limiting the drive range narrower than that during a period from the time when the first operational instruction is received to the time when the second operational instruction is received and during main photographing. The drive range may be restricted by lessening the amount of camera shake correction, that is, by lessening the drive amount of the camera shake correction lens 12 with respect to the camera shake.

Next, a sixth embodiment of the present invention will be described. The structure of a digital camera according to the sixth embodiment is identical to that of the digital camera 1 according to the first embodiment and only the operation thereof is different, so that the structure will not be elaborated upon further here. In the sixth embodiment, the drive range of the camera shake correction lens 12 is restricted based on a shutter speed calculated by AF processing.

Figure 22:
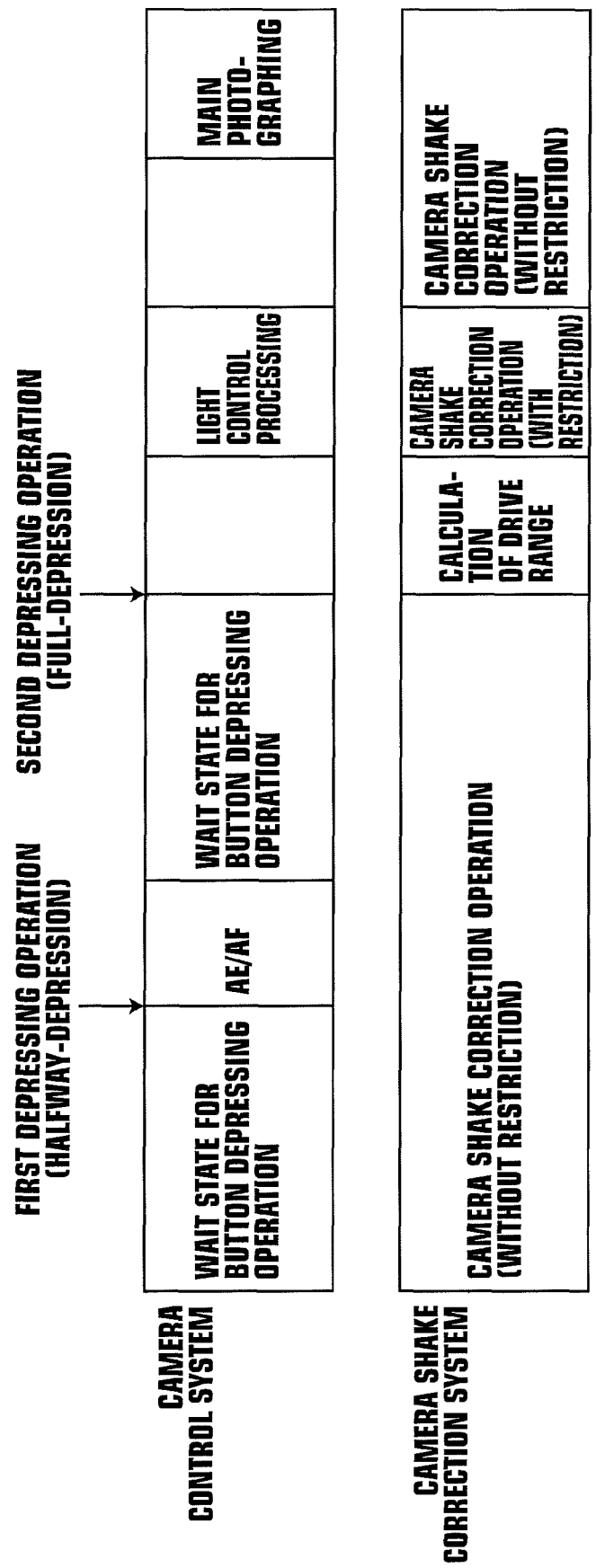
FIG. 22 illustrates operations of a camera control system and a camera shake correction system arranged in time series from left to right in a sixth embodiment.
Figure 23:
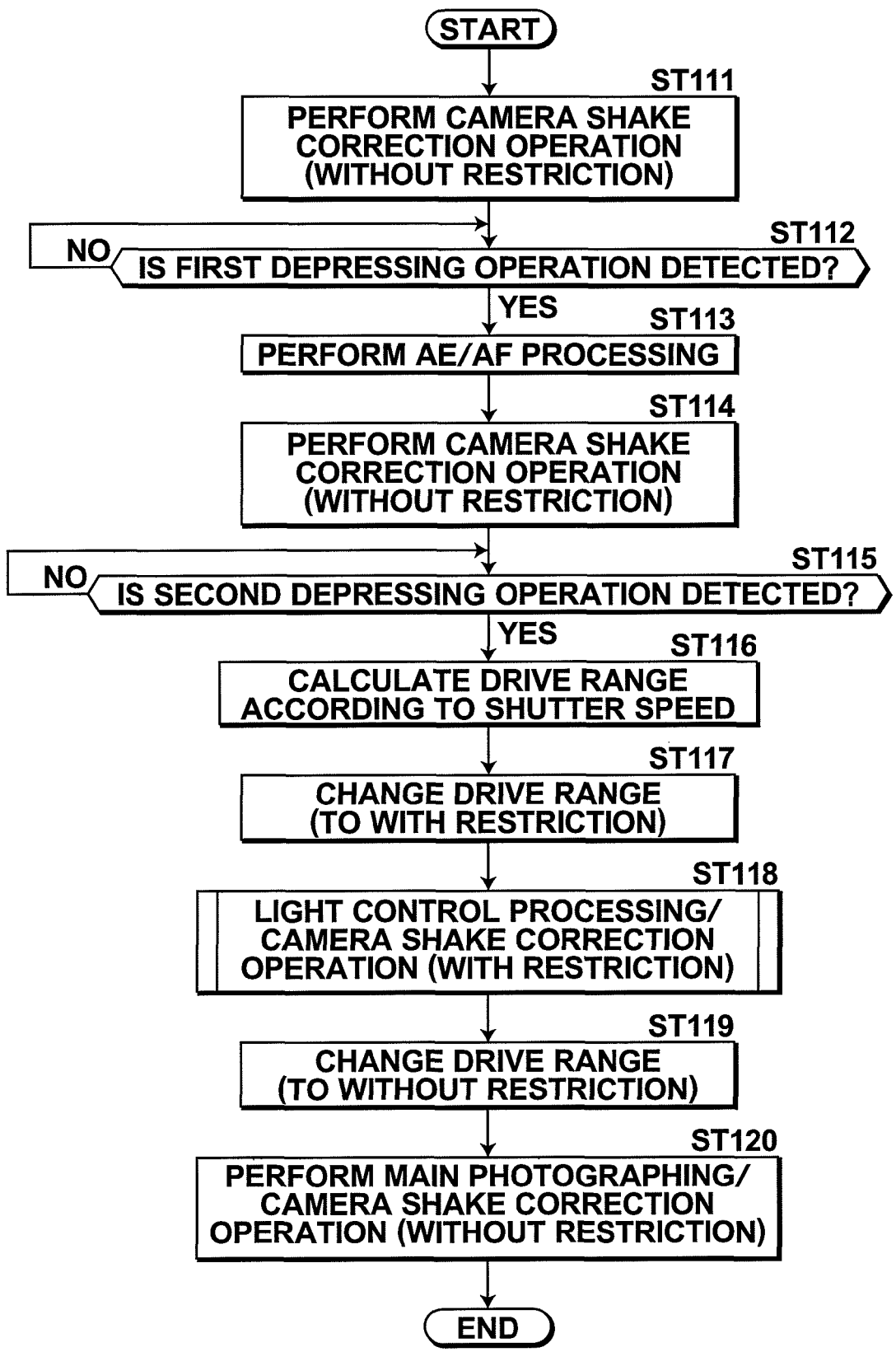
FIG. 23 is a flowchart illustrating processing performed in the sixth embodiment.

FIG. 22 illustrates operations of the camera control system and the camera shake correction system arranged in time series from left to right in the sixth embodiment. FIG. 23 is a flowchart illustrating processing performed in the sixth embodiment. Processing steps from ST111 to ST115 in the sixth embodiment are identical to processing steps from ST101 to ST105 in the fifth embodiment, so that they will not be elaborated upon further here.

If step ST115 is positive, the overall control unit 35 calculates, based on the setting of "Weak Correction", a drive range of the camera shake correction lens 12 in restriction mode by formula (2) below according to the shutter speed calculated by AE processing (step ST116).

$$D1 = k \times Tv \text{ value} \times D0 \quad (2)$$

In formula (2) above, D0 is a standard drive range from the center of drive (i.e., a drivable distance from the center of drive) in restriction mode, D1 is a calculated drive range (drivable distance from the center of drive), k is a constant, and Tv value=$-\log_2 t$ (t is the shutter speed). The drive range D1 calculated in the manner as described above becomes wider as the shutter speed increases.

Next, the overall control unit 35 instructs the camera shake detection unit 25 to change the drive range of the camera shake correction lens 12 so that the range is restricted based on the calculated drive range D1. This causes the drive range of the camera shake correction lens 12 is changed to "with restriction" (step ST117). Then, the emission control unit 23 performs light control processing (step ST118). It is noted that the camera shake correction operation is performed continuously during the light control processing but the drive range is restricted.

When the light control processing is completed, the overall control unit 35 instructs the camera shake detection unit 25 to change the drive range of the camera shake correction lens 12 to that without restriction. This causes the drive range of the camera shake correction lens 12 to be changed to that without restriction (step ST119). Then, the overall control unit 35 causes a main photographing operation to be performed (step ST120), which concludes the processing. During this period, the camera shake correction operation is performed continuously. In this case, the camera shake correction operation is not restricted.

Here, in the case of a high speed shutter operation as in daylight synchro photographing, driving of the camera shake correction lens 12 is not practically required at the time of main photographing. Contrary, in the case of a low speed shutter operation as in slow synchro photographing, so that a sufficient camera shake correction is required at the time of main photographing. In the sixth embodiment, the drive range of the camera shake correction lens 12 at the time of light control is calculated according to the shutter speed. More specifically, the drive range is restricted such that the higher the shutter speed, the wider the drive range D1. Consequently, the camera shake correction lens 12 may be driven effectively in consideration of a camera shake correction amount at the time of main photographing.

Next, a seventh embodiment of the present embodiment will be described. The structure of a digital camera according to the seventh embodiment is identical to that of the digital camera 1 according to the first embodiment and only the operation thereof is different, so that the structure will not be elaborated upon further here. In the seventh embodiment, the drive range of the camera shake correction lens 12 is controlled based on a focal length calculated by AF processing.

Figure 24:
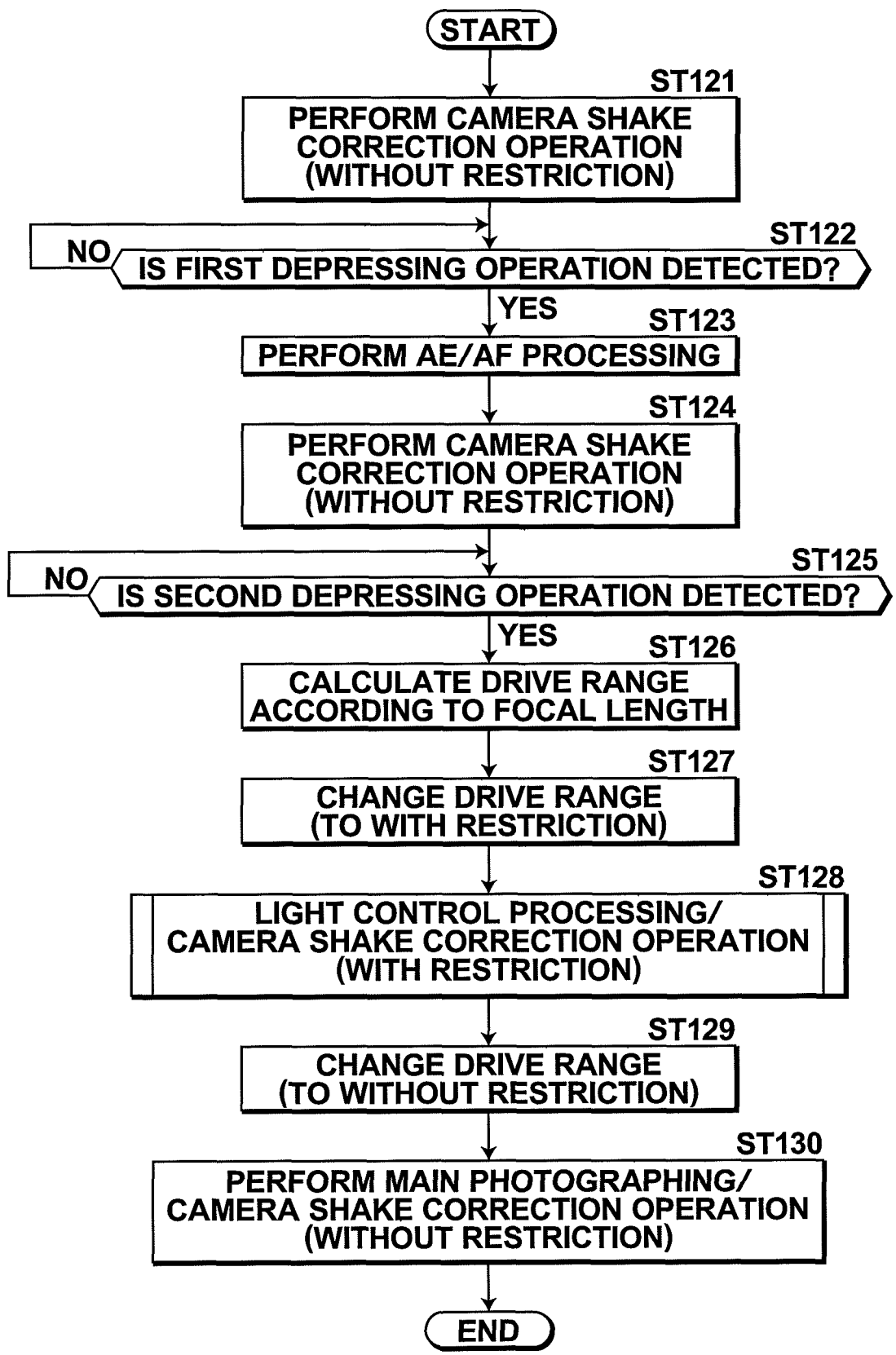
FIG. 24 is a flowchart illustrating processing performed in a seventh embodiment.

FIG. 24 is a flowchart illustrating processing performed in the seventh embodiment. The drawing illustrating operations of the camera control system and the camera shake correction system arranged in time series from left to right in the seventh embodiment is identical to that of the sixth embodiment, and therefore omitted here. Further, processing steps from ST121 to ST125 in the seventh embodiment are identical to processing steps from ST101 to ST105 in the fifth embodiment, so that they will not be elaborated upon further here.

If step ST125 is positive, the overall control unit 35 calculates, based on the setting of "Weak Correction", a drive range of the camera shake correction lens 12 in restriction mode by formula (3) below according to the focal length calculated by AF processing (step ST126).

$$D1 = k \times D0 / \text{focal length} \quad (3)$$

In formula (3) above, D0 is a standard drive range from the center of drive (i.e., a drivable distance from the center of drive) in restriction mode, D1 is a calculated drive range (drivable distance from the center of drive), k is a constant. The drive range D1 calculated in the manner as described above becomes narrower as the focal length becomes longer.

Next, the overall control unit 35 instructs the camera shake detection unit 25 to change the drive range of the camera shake correction lens 12 so that the range is restricted based on the calculated drive range D1. This causes the drive range of the camera shake correction lens 12 is changed to "with restriction" (step ST127). Then, the emission control unit 23 performs light control processing (step ST128). It is noted that the camera shake correction operation is performed continuously during the light control processing but the drive range is restricted.

When the light control processing is completed, the overall control unit 35 instructs the camera shake detection unit 25 to change the drive range of the camera shake correction lens 12 to that without restriction. This causes the drive range of the camera shake correction lens 12 to be changed to that without restriction (step ST129). Then, the overall control unit 35 causes a main photographing operation to be performed (step ST130), which concludes the processing. During this period, the camera shake correction operation is performed continuously. In this case, the camera shake correction operation is not restricted.

Here, if the focal length is long, the subject is far away from the digital camera 1 and a camera shake does not cause any appreciable image shake, driving of the camera shake correction lens 12 is not practically required at the time of main photographing. Contrary, if the focal length is short, the subject is near the digital camera 1 and a camera shake causes a large amount of image blur, so that a sufficient camera shake correction is required at the time of main photographing. In the seventh embodiment, the drive range of the camera shake correction lens 12 at the time of light control is calculated according to the focal length. More specifically, the drive range is restricted such that the longer the focal length, the wider the drive range D1. Consequently, the camera shake correction lens 12 may be driven effectively in consideration of a camera shake correction amount at the time of main photographing.

Next, an eighth embodiment of the present invention will be described. The structure of a digital camera according to the eighth embodiment is identical to that of the digital camera 1 according to the first embodiment and only the operation thereof is different, so that the structure will not be elaborated upon further here. In the eighth embodiment, the camera shake correction lens 12 is driven to the center of drive thereof after light control processing.

Figure 25:
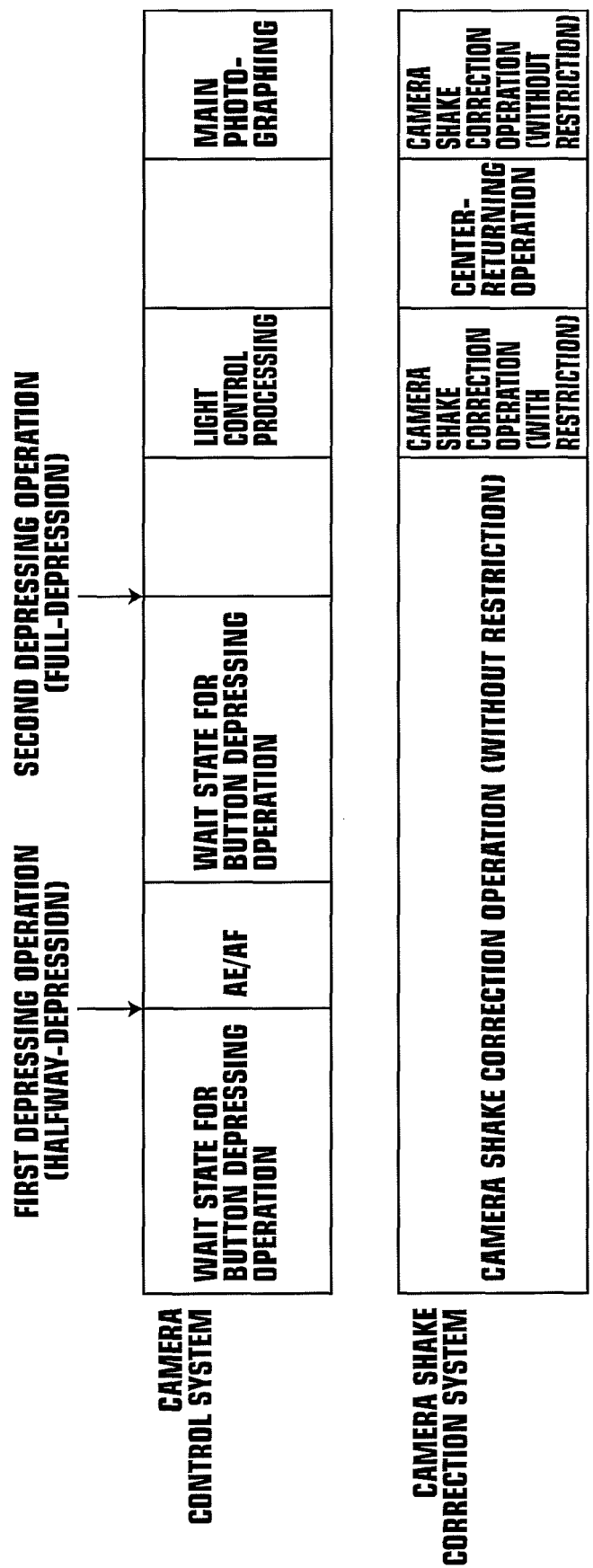
FIG. 25 illustrates operations of a camera control system and a camera shake correction system arranged in time series from left to right in an eighth embodiment (part 1).
Figure 26:
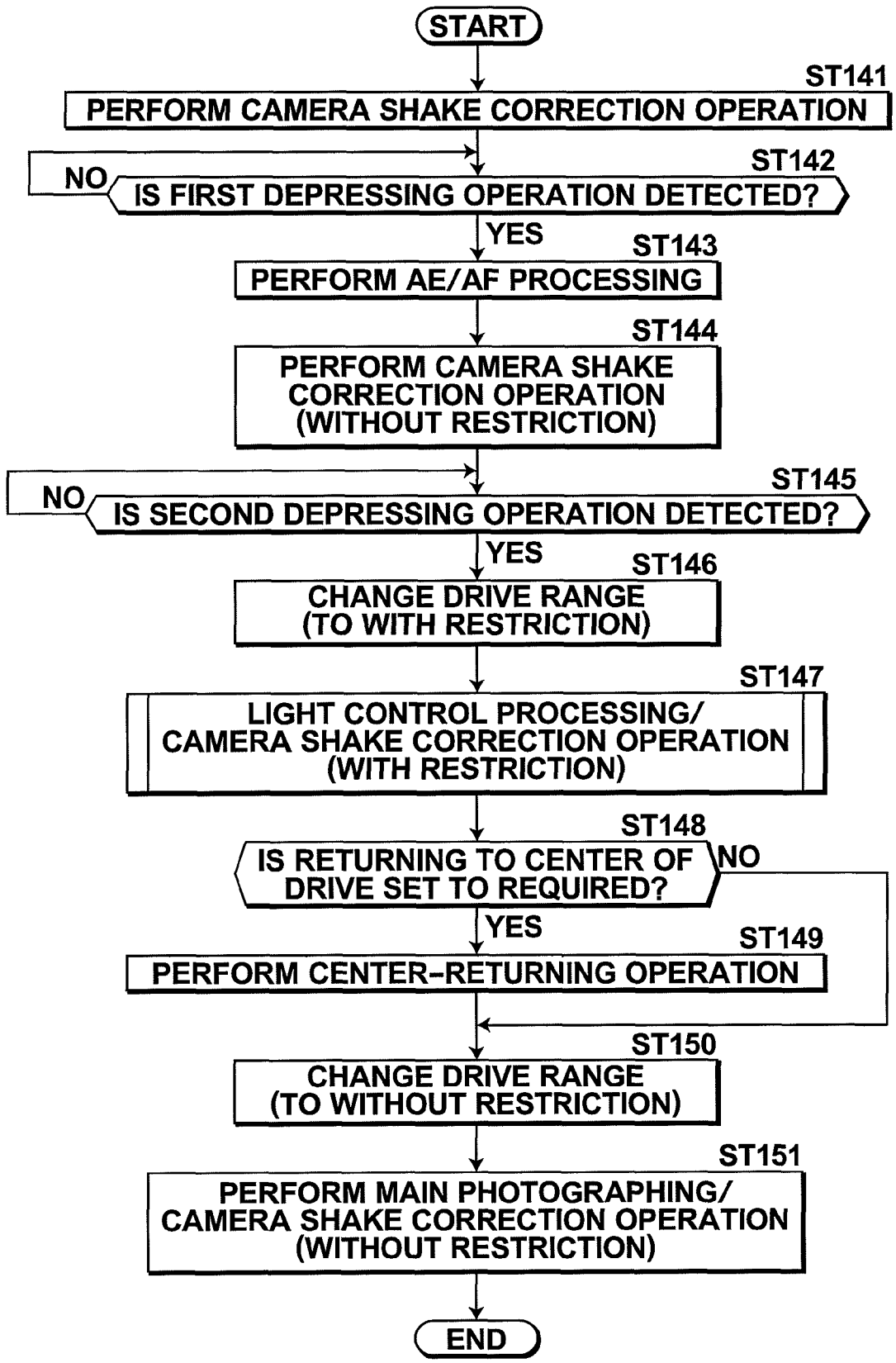
FIG. 26 is a flowchart illustrating processing performed in the eighth embodiment.

FIG. 25 illustrates operations of the camera control system and the camera shake correction system arranged in time series from left to right in the eighth embodiment, and FIG. 26 is a flowchart illustrating processing performed in the eighth embodiment. The processing steps from ST141 to ST147 in the eighth embodiment are identical to processing steps from ST101 to ST107 in the fifth embodiment, so that they will not be elaborated upon further here.

When light control processing is completed, the overall control unit 35 determines whether or not one of the setting values stored in the EEPROM, which indicates whether or not the camera shake correction lens 12 needs to be returned to the center of drive, is set to a value representing "required" (step ST148). If step ST148 is positive, the camera shake detection unit 25 instructs the correction lens drive unit 16 to return the camera shake correction lens 12 to the center of drive, based on an instruction from the overall control unit 35, thereby the camera shake correction lens 12 is returned to the center of drive (center-returning operation, step ST149). It is noted that position information of the center of drive is stored in the EEPROM 34 in advance. If step ST148 is negative, the processing proceeds to step ST150.

Then, the overall control unit 35 instructs the camera shake detection unit 25 to change the drive range of the camera shake correction lens 12 to that without restriction. This causes the drive range of the camera shake correction lens 12 to be changed to that without restriction (step ST150). Then, the overall control unit 35 causes a main photographing operation to be performed (step ST151), which concludes the processing. During the main photographing operation, the camera shake correction operation is performed continuously. In this case, the camera shake correction operation is not restricted.

As described above, in the eighth embodiment, the camera shake correction lens 12 is returned to the center of drive before main photographing, so that the camera shake correction lens 12 may be driven maximally in any direction within the drive range before main photographing. Accordingly, camera shake correction may be performed effectively at the time of main photographing.

In the eighth embodiment, it is desirable that the timing of returning the camera shake correction lens 12 to the center of drive is immediately before main photographing, but not limited to this. The returning timing may be any timing as long as it is before an arbitrary timing during main photographing.

Figure 27:
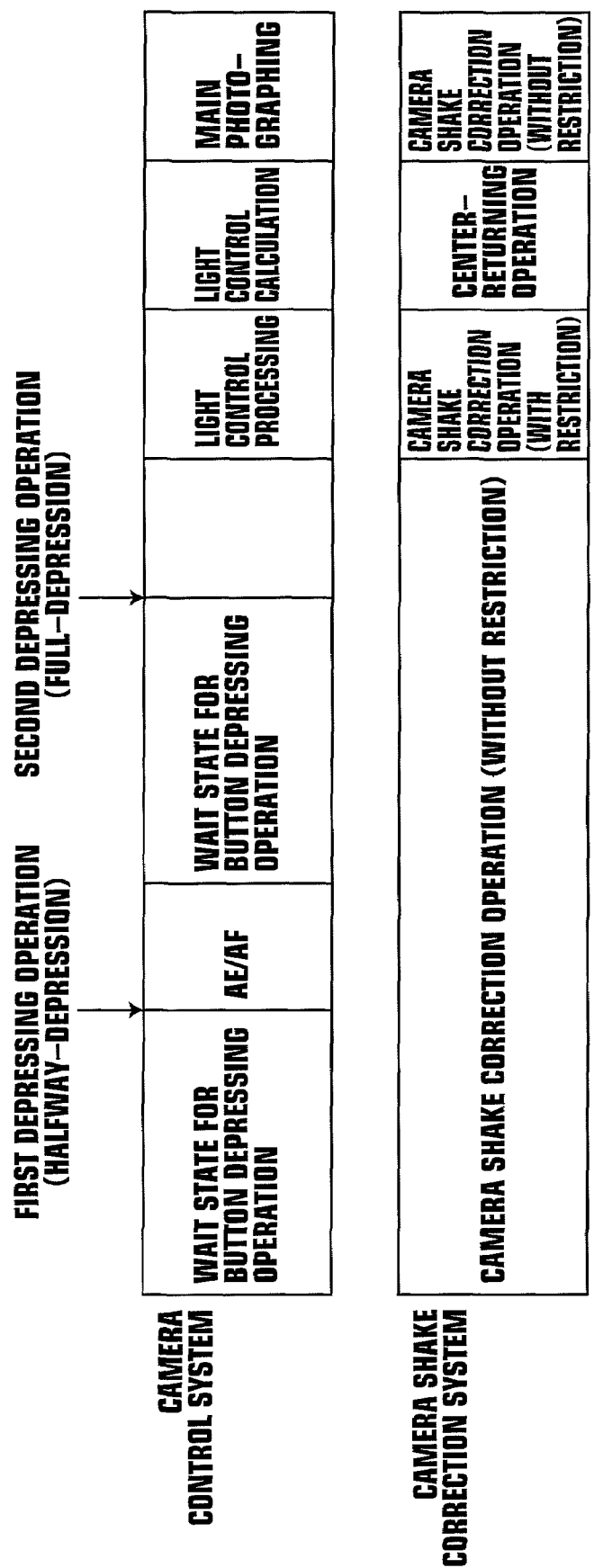
FIG. 27 illustrates operations of a camera control system and a camera shake correction system arranged in time series from left to right in an eighth embodiment (part 2).

Further, in the eighth embodiment, the camera shake correction lens is driven to the center of drive after light control processing. But, as shown in FIG. 27, an arrangement may be adopted in which the camera shake correction lens 12 is returned to the center of drive during light control calculation following light control exposure, since the camera shake correction is not required during the light control calculation following the light control exposure. This allows the camera shake correction lens 12 to be returned to the center of drive without affecting light control exposure and main photographing through the use of a period that does not require camera shake correction.

Still further, in the eighth embodiment, the camera shake correction lens 12 is returned to the center of drive. But the camera shake correction lens 12 is not necessarily returned to the center of drive and may be returned to an arbitrary position adjacent to the center of drive. Returning control of the camera shake correction lens 12 may be performed easily by storing a coordinate value of a position to which the camera shake correction lens 12 is driven in the EEPROM 34 and driving the camera shake correction lens 12 with reference to the coordinate value.

Further, in the eighth embodiment, an arrangement may be adopted in which the camera shake correction lens 12 is returned to the center of drive prior to light control processing. This allows the camera shake correction lens 12 to be driven effectively also during the light control exposure. In this case, the camera shake correction lens 12 is not necessarily returned to the same position prior to light control exposure and prior to main photographing, and may be returned to different positions adjacent to the center of drive.

Next, a ninth embodiment of the present invention will be described. The structure of a digital camera according to the ninth embodiment is identical to that of the digital camera 1 according to the first embodiment and only the operation thereof is different, so that the structure will not be elaborated upon further here. In the ninth embodiment, the camera shake correction lens 12 is driven to the center of drive thereof after light control processing, as in the eighth embodiment.

Figure 28:
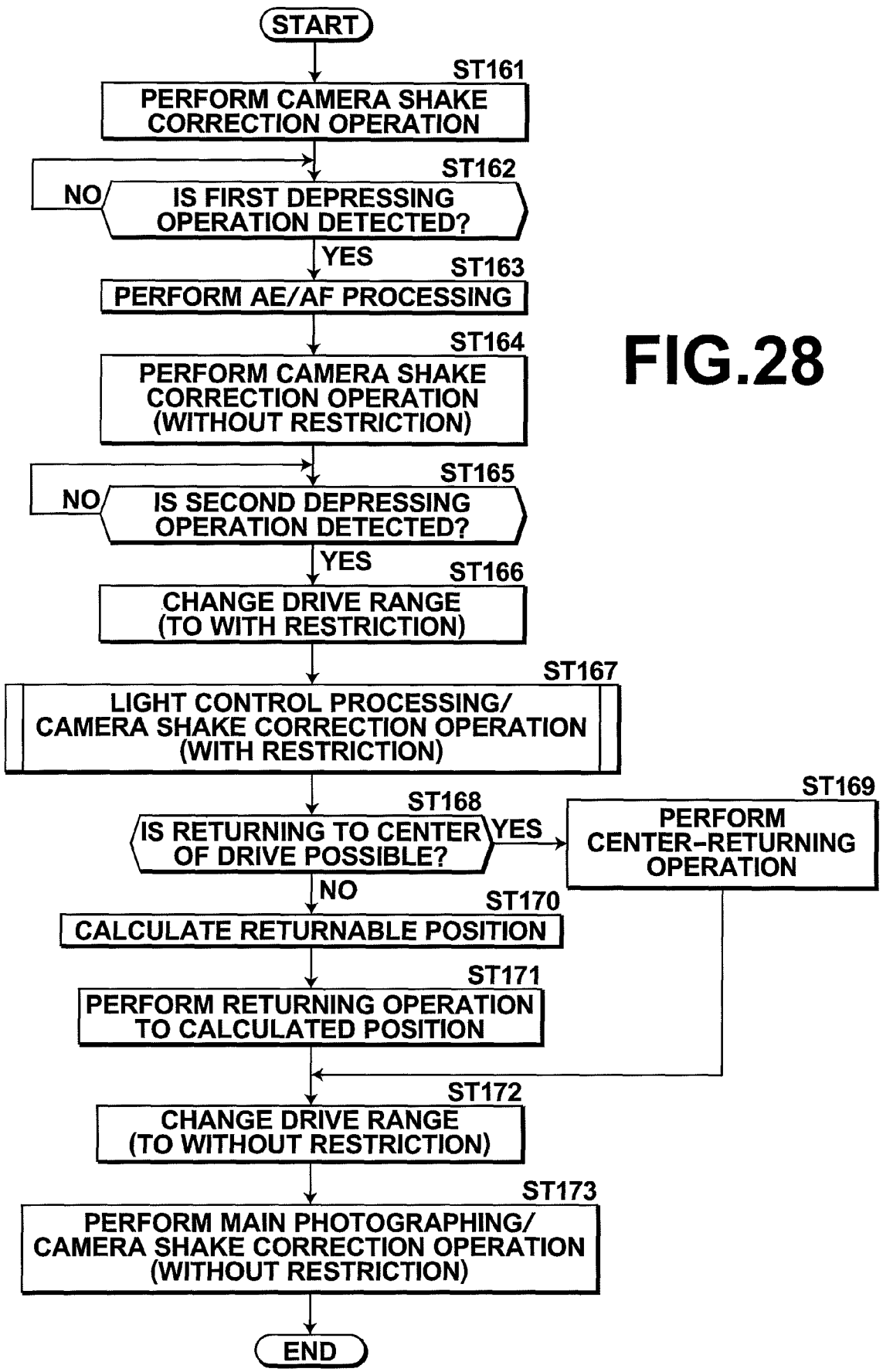
FIG. 28 is a flowchart illustrating processing performed in a ninth embodiment.

FIG. 28 is a flowchart illustrating processing performed in the ninth embodiment. In the ninth embodiment, the drawing illustrating operations of the camera control system and the camera shake correction system arranged in time series from left to right is identical to that of the eighth embodiment, and hence omitted here. Further, processing steps from ST161 to ST167 in the ninth embodiment are identical to processing steps from ST101 to ST107 in the fifth embodiment, so that they will not be elaborated upon further here. In the ninth embodiment, it is assumed that the digital camera is set to return the camera shake lens 12 to the center of drive after a second depressing operation.

When light control processing is completed, the overall control unit 35 detects the current position of the camera shake correction lens 12 determines whether or not the camera shake correction lens 12 can be returned from the detected position to the center of drive within a predetermined time limit (step ST168). If step ST168 is positive, the camera shake detection unit 25 instructs the correction lens drive unit 16 to return the camera shake correction lens 12 to the center of drive based on an instruction from the overall control unit 35, thereby the camera shake correction lens 12 is returned to the center of drive (center-returning operation, step ST169). It is noted that position information of the center of drive is stored in the EEPROM 34 in advance. The processing proceeds to step ST172 following step ST169.

If step ST168 is negative, calculates a position where the camera shake correction lens 12 can be returned within the predetermined time limit (step ST170).

Figure 29:
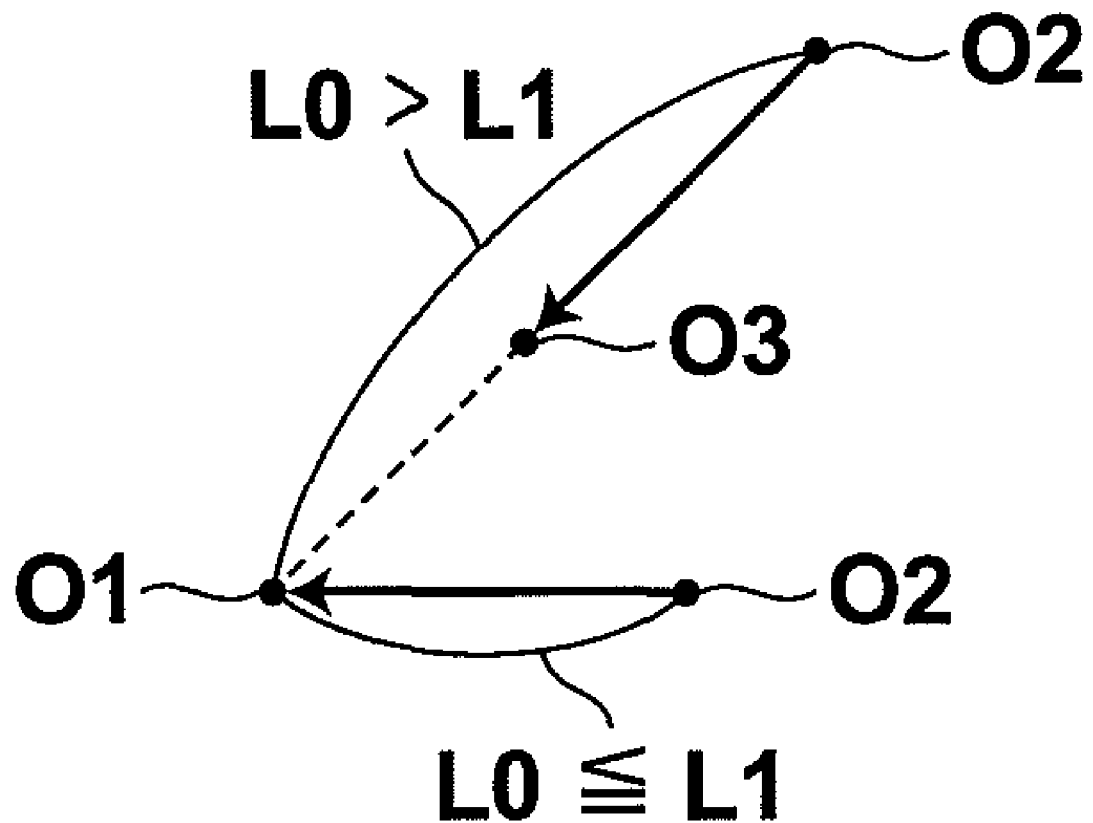
FIG. 29 illustrates calculation of a returnable position.

FIG. 29 illustrates calculation of a returnable position. In FIG. 29, a point O1 represents the center of drive of the camera shake correction lens 12 and a point O2 represents a point on the optical axis of the camera shake correction lens 12. Hereinafter, the point O2 is referred to as the center of the camera shake correction lens 12. Now, let a drivable distance of the camera shake correction lens 12 within the predetermined time limit t1 be L1, the camera shake correction lens 12 can be returned to the center of drive if the distance L0 from the center O2 of the camera shake lens 12 to the center of drive O1 is within the distance L1, as shown in FIG. 29. But, if the distance L0 from the center O2 of the camera shake lens 12 to the center of drive O1 exceeds the distance L1, the camera shake correction lens 12 can not be returned to the center of drive O1.

Therefore, the correction lens drive unit 16 performs the processing of step ST168 by determining whether or not the distance L0 is not greater than the distance L1. If step ST168 is negative, a point on the line correcting the center O2 of the camera shake correction lens 12 and the center of drive O1 which is the point closest to the center of drive where the camera shake correction lens 12 can be returned within the predetermined time limit is calculated as a returnable position O3.

Then, based on an instruction from the overall control unit 35, the camera shake detection unit 25 instructs the correction lens drive unit 16 to return the camera shake correction lens 12 to the calculated returnable position, thereby the camera shake correction lens 12 is returned to the calculated returnable position (returning operation to a calculated position, step ST171). Next, the overall control unit 35 instructs the camera shake detection unit 25 to change the drive range of the camera shake correction lens 12 to that without restriction. This causes the drive range of the camera shake correction lens 12 to be changed to that without restriction (step ST172). Then, the overall control unit 35 causes a main photographing operation to be performed (step ST173), which concludes the processing. During the main photographing operation, the camera shake correction operation is performed continuously. In this case, the camera shake correction operation is not restricted.

As describe above, in the ninth embodiment, the position where the camera shake correction lens 12 is to be returned is changed according to a current position of the camera shake correction lens 12. This allows the camera shake correction lens 12 to be driven to a closest possible position to the center of drive when the camera shake correction lens can not be returned to the center of drive. As a result, camera shake correction may be performed effectively at the time of main photographing.

In the ninth embodiment, it is desirable that the timing of returning the camera shake correction lens 12 to the center of drive is immediately before main photographing, but not limited to this. The returning timing may be any timing as long as it is before an arbitrary timing during main photographing.

Further, in the ninth embodiment, an arrangement may be made in which the camera shake correction lens 12 is returned to the center of drive before light control processing. This allows the camera shake correction lens 12 to be driven effectively also during the light control exposure. In this case also, processing steps from ST169 to ST171 in the flowchart of FIG. 28 may be performed.

Next, a tenth embodiment of the present invention will be described. The structure of a digital camera according to the tenth embodiment is identical to that of the digital camera 1 according to the first embodiment and only the operation thereof is different, so that the structure will not be elaborated upon further here. In the tenth embodiment, the drive range of the camera shake correction lens 12 is controlled so as to be decreased with time from the start of light control exposure in light control processing. Here, the light control exposure means the processing of steps ST21 and ST22 in the flowchart of FIG. 8, and light control processing means the processing of steps ST23 to ST25 in the flowchart.

Figure 30:
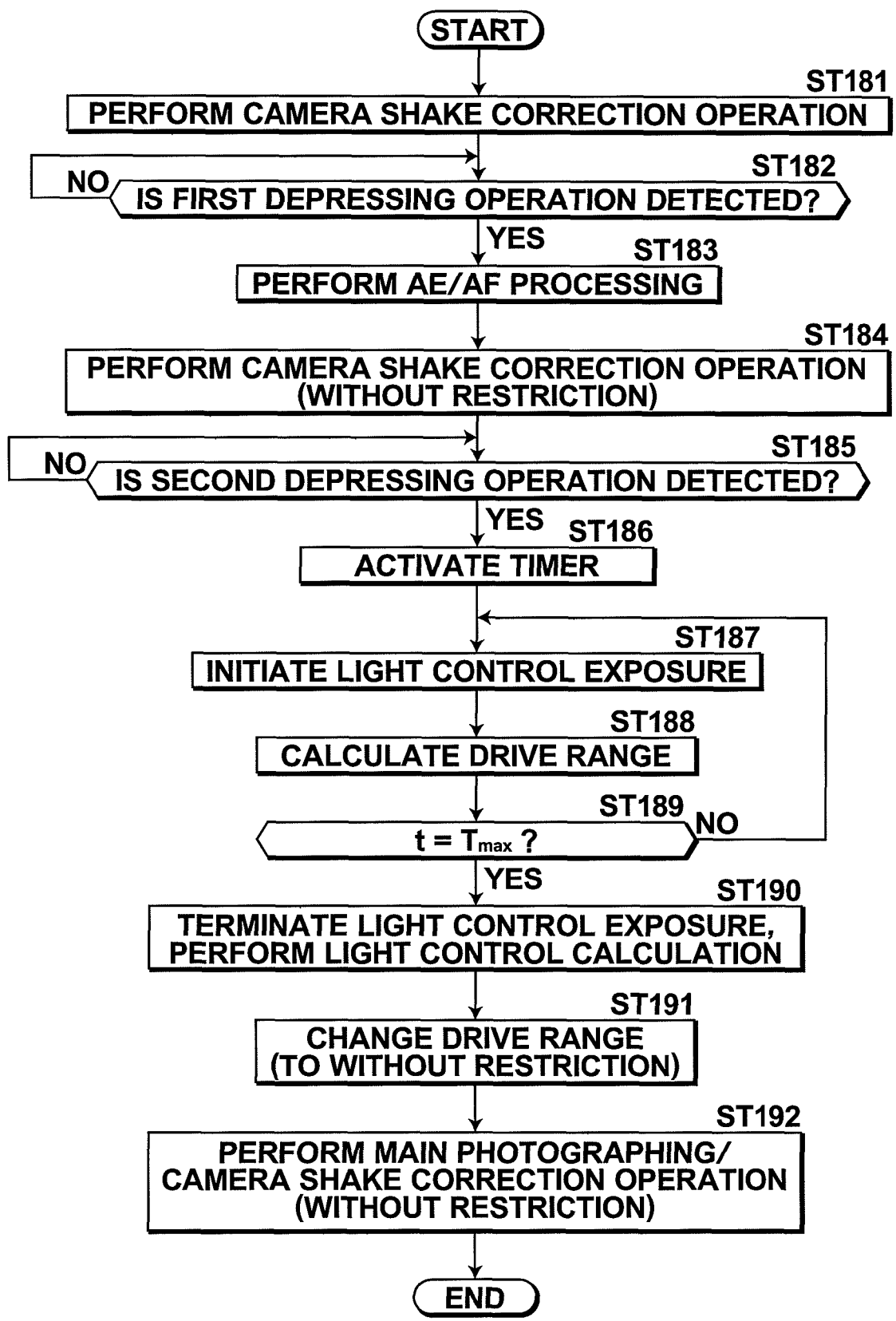
FIG. 30 is a flowchart illustrating processing performed in a tenth embodiment.

FIG. 30 is a flowchart illustrating processing performed in the tenth embodiment. In the tenth embodiment, the drawing illustrating operations of the camera control system and the camera shake correction system arranged in time series from left to right is identical to that of the first embodiment, and hence omitted here. Further, processing steps from ST181 to ST185 in the tenth embodiment are identical to processing steps from ST101 to ST105 in the fifth embodiment, so that they will not be elaborated upon further here.

If step ST185 is positive, the overall control unit 35 activates a timer for measuring an elapsed time t of light control processing (step ST186). Then, the emission control unit 23 initiates light control exposure in light control processing (step ST187). Next, the overall control unit 35 calculates a drive range d (i.e., a drivable distance from the center of drive) of the camera shake correction lens 12 by formula (4) below based on a current elapsed time t.

$$d = D0 \times (1 - t/T_{max}) \quad (4)$$

where, D0 is a standard drive range from the center of drive in restriction mode, $T_{max}$ is a time required for completing the light control exposure. By formula (4), the drive range d of the camera shake correction lens 12 becomes narrower as the elapsed time t becomes longer, and when the elapsed time corresponds to $T_{max}$, the drive range d of the camera shake correction lens 12 becomes zero.

Next, the overall control unit 35 determines whether or not the elapsed time t has reached $T_{max}$ (step ST189). If step ST189 is negative, the processing returns to step ST187 and processing steps from step ST187 onwards are repeated. When step ST189 turns to positive, the light control exposure is terminated and light control calculation is performed (step ST190).

When the light control calculation is completed, the overall control unit 35 instructs the camera shake detection unit 25 to change the drive range of the camera shake correction lens 12 to that without restriction. This causes the drive range of the camera shake correction lens 12 to be changed to that without restriction (step ST191). Then, the overall control unit 35 causes a main photographing operation to be performed (step ST191), which concludes the processing. During the main photographing operation, the camera shake correction operation is performed continuously. In this case, the camera shake correction operation is not restricted.

As described above, in the tenth embodiment, the drive range of the camera shake correction lens 12 is reduced according to the elapsed time t from the start of light control exposure, so that the drive range of the camera shake correction lens 12 may be made narrower as the main photographing draws nearer. Accordingly, the camera shake correction lens 12 may be driven to a position that allows the camera shake correction lens 12 to be driven largely prior to main photographing. As a result, camera shake correction may be performed effectively at the time of main photographing.

In the tenth embodiment, an arrangement may be adopted in which the camera shake correction lens 12 is driven to the center of drive when the elapsed time t has reached $T_{max}$. In this case, the camera shake correction lens 12 may be reliably driven to the center of drive prior to main photographing, since the drive range of the camera shake correction lens 12 is reduced according to an elapsed time t from the start of light control exposure in the tenth embodiment.

Next an eleventh embodiment of the present invention will be described. The structure of a digital camera according to the eleventh embodiment is identical to that of the digital camera 1 according to the first embodiment and only the operation thereof is different, so that the structure will not be elaborated upon further here. In the eleventh embodiment, the camera shake correction lens 12 is returned to the center of drive when a drive amount of the camera shake correction lens 12 exceeds a threshold value from the start of light control exposure of light control processing.

Figure 31:
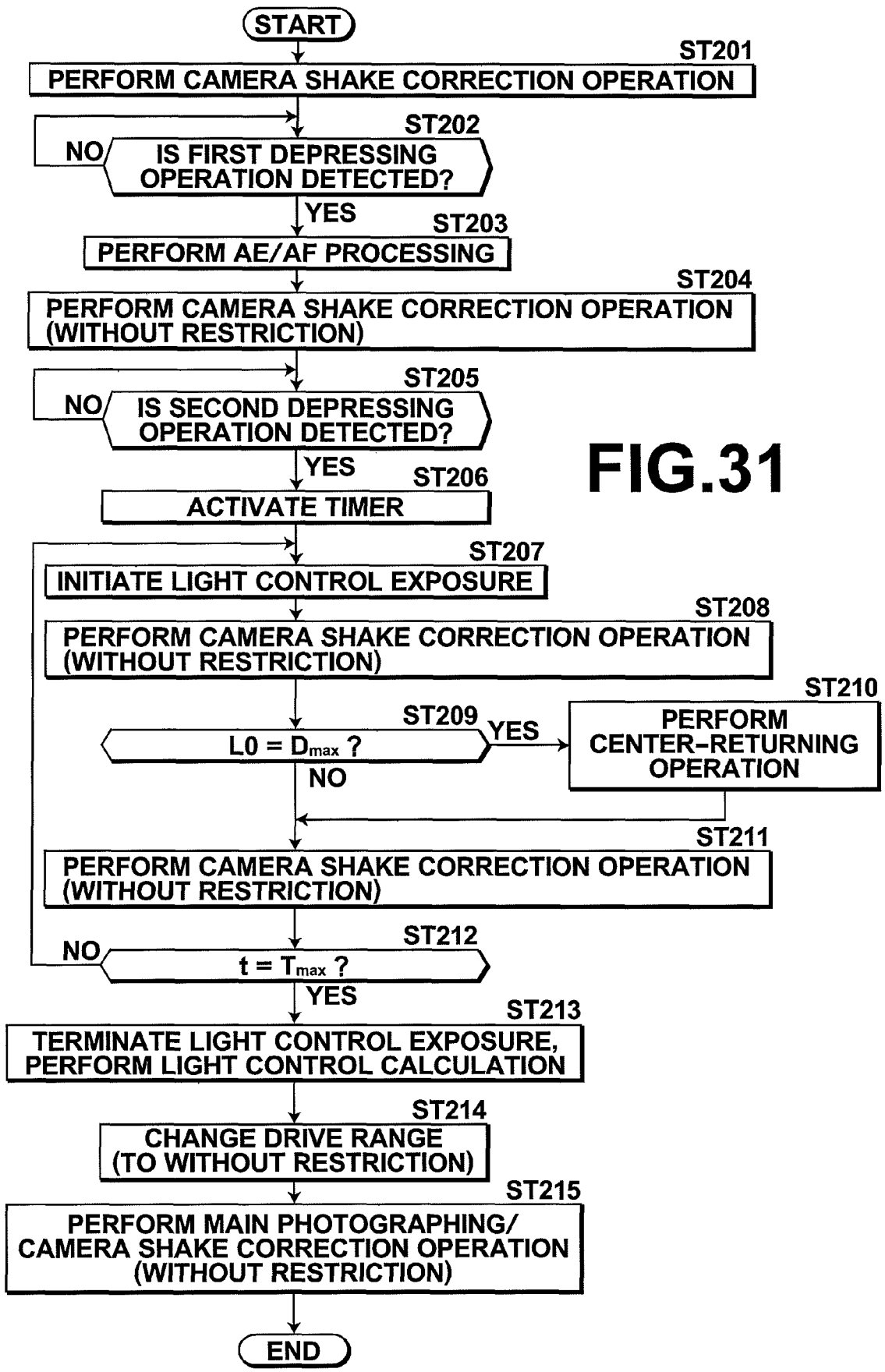
FIG. 31 is a flowchart illustrating processing performed in an eleventh embodiment.

FIG. 31 is a flowchart illustrating processing performed in the eleventh embodiment. In the eleventh embodiment, the drawing illustrating operations of the camera control system and the camera shake correction system arranged in time series from left to right is identical to that of the fifth embodiment, and hence omitted here. Further, processing steps from ST201 to ST207 in the eleventh embodiment are identical to processing steps from ST181 to ST187 in the tenth embodiment, so that they will not be elaborated upon further here.

Following step ST207, the camera shake correction operation is continuously performed (step ST208). The camera shake correction operation during the light control exposure is not restricted. Then, the overall control unit 35 determines whether or not a distance L0 of the camera shake correction lens 12 from the center of drive becomes greater or equal to a predetermined threshold value $D_{max}$ (step ST209). If step ST209 is positive, the camera shake detection unit 25 instructs the correction lens drive unit 16 to return the camera shake correction lens 12 to the center of drive based on an instruction from the overall control unit 35, thereby the camera shake correction lens 12 is returned to the center of drive (center-returning operation, step ST210), and the processing proceeds to step ST211. If step ST209 is negative, the camera shake correction without restriction is continued (step ST211).

Then, the overall control unit determines whether or not the elapsed time t has reached the $T_{max}$ (step ST212). If step ST212 is negative, the processing returns to step ST207 and processing steps from step ST207 onwards are repeated. When step ST212 turns to positive, the light control exposure is terminated and light control calculation is performed (step ST213).

When the light control calculation is completed, the overall control unit 35 instructs the camera shake detection unit 25 to change the drive range of the camera shake correction lens 12 to that without restriction. This causes the drive range of the camera shake correction lens 12 to be changed to that without restriction (step ST214). The term "without restriction" in step ST214 means that the camera shake correction lens 12 is not returned to the center of drive even when the distance L0 becomes greater than or equal to $D_{max}$. Then, the overall control unit 35 causes a main photographing operation to be performed (step ST215), which concludes the processing. During the main photographing operation, the camera shake correction operation is performed continuously. In this case, the camera shake correction operation is not restricted.

As described above, in the eleventh embodiment, the camera shake correction lens 12 is returned to the center of drive when the distance L0 of the camera shake correction lens 12 from the center of drive becomes greater than or equal to the threshold value $D_{max}$ during a period of light control exposure. This prevents the camera shake correction lens 12 from being placed largely away from the center of drive. As a result, camera shake correction maybe performed effectively at the time of main photographing.

In the eleventh embodiment, an arrangement may be adopted in which the camera shake correction lens is driven to the center of drive when the elapsed time t has reached $T_{max}$. In this case, the camera shake correction lens 12 may be reliably driven to the center of drive prior to main photographing, since the distance L0 of the camera shake correction lens 12 from the center of drive is always maintained less than $D_{max}$ during light control exposure in the eleventh embodiment.

In the fifth to eleventh embodiments, an arrangement may be adopted in which drive information of the camera shake correction lens 12 is attached to image data of main photographing by the record/readout control unit 31. FIG. 32 illustrates an example of drive information. As shown in FIG. 32, the drive information includes information indicating drive range at light control which represents the ratio of a drive range at the time of light control processing to a drive range without restriction, information indicating correction ratio at light control which represents the ratio of a time during which the camera shake correction lens 12 is driven validly to a time required for light control processing, and information indicating a returned position. Here, the returned position is the center of drive. The drive information may be provided in any form as long as the drive information is described in text data having the same file name as image data and the image data and drive information are inseparably integrated, as well as described in the tag of the image data.

By providing drive information to image data in the manner as described above, the image data may be processed appropriately by referring to the drive information at a later time. For example, if the returned position after light control exposure is not the center of drive, it is likely that the image is blurred by camera shake, so that image processing for removing the camera shake may be performed. Further, if the returned position before light control exposure is not the center of drive, it is likely that an emission amount of the flash 22 is not appropriate, so that image processing giving priority to adjusting image brightness and contrast may be performed.

Further, in the fifth to eleventh embodiments, light control exposure is performed. But the light control exposure is not necessarily required, and digital cameras in which the camera shake correction lens 12 is returned to the center of drive prior to main photographing all belong to the technical scope of the present invention.

So far, embodiments of the digital camera 1 according to the present invention have been described. A program for causing a computer to perform the processing shown in FIGS. 7, 8, 13, 16, 17, 21, 23, 24, 26, 28, 30, and 31 is also one of the embodiments of the present invention. Further, a computer readable recording medium on which such program is recorded is another embodiment of the present invention.

What is claimed is:

1. A photographing apparatus comprising:
    a photographing means that photographs a subject to obtain an image representing the subject by receiving an instruction to perform photographing;
    a camera shake correction means constructed to be driven in a direction different from the optical axis of the photographing means and corrects a camera shake induced blur of an image to be obtained by the photographing; and
    a correction system driving means that receives an instruction to perform main photographing and initiates driving of the camera shake correction means from a first predetermined position during a period from the time when the instruction to perform main photographing is given to the time when the subject is photographed, and drives the camera shake correction means to a second predetermined position during a period from the time when the driving is initiated to the time when the main photographing is performed.

2. The photographing apparatus according to claim 1, wherein the correction system driving means is a means that determines whether or not the camera shake correction means is located at the first predetermined position when the instruction to perform main photographing is received and, if the determination is negative, drives the camera shake correction means to the first predetermined position before initiating the driving of the camera shake correction means.

3. The photographing apparatus according to claim 1, further comprising:
    an emission means that emits a flash; and
    an emission control means that, upon receipt of the instruction to perform main photographing, controls the emission amount of the flash at the time of the main photographing by performing a flash exposure and a non-flash exposure and performing a calculation based on a result of the exposures prior to the main photographing,
    wherein the correction system driving means is a means that drives the camera shake correction means to the first predetermined position before a first time point during the period of the exposures, and drives the camera shake correction means to the second predetermined position after a second time point during the period of the exposures following the first time point.

4. The photographing apparatus according to claim 3, wherein the correction system driving means is a means that drives the camera shake correction means to the predetermined second position while the calculation based on the result of the exposures is performed.

5. The photographing apparatus according to claim 3, wherein, when causing the emission means to emit red-eye reduction light, the correction system driving means is a means that drives the camera shake correction means to the predetermined first position while the red-eye reduction light is emitted or during a predetermined period after the emission of the red-eye reduction light.

6. The photographing apparatus according to claim 1, wherein at least one of the first and second predetermined positions is the center of drive of the camera shake correction means.

7. The photographing apparatus according to claim 1, wherein the first and second predetermined positions are the same position.

8. The photographing apparatus according to claim 1, further comprising a storage means that stores information of the first and second predetermined positions.

9. The photographing apparatus according to claim 1, wherein the correction system driving means is a means that causes the camera shake correction means to have different drive performance from each other before the driving thereof from the first predetermined position is initiated and at an arbitrary time point after the driving thereof from the first predetermined position is initiated.

10. The photographing apparatus according to claim 9, wherein the correction system driving means is a means that causes the camera shake correction means to have different drive performance from each other during a period from the time when an instruction to prepare for photographing is received to the time when the instruction to perform main photographing is received and at an arbitrary time point after the driving thereof from the first predetermined position is initiated.

11. The photographing apparatus according to claim 1, wherein, when driving the camera shake correction means to the first and/or second predetermined position, the correction system driving means is a means that detects a position of the camera shake correction means and determines whether or not to drive the camera shake correction means to the first and/or second predetermined position according to the detected position.

12. The photographing apparatus according to claim 11, wherein the correction system driving means is a means that inhibits the driving of the camera shake correction means to the first and/or second predetermined position when the detected position of the camera shake correction means is within a first predetermined range and within a second predetermined range from the first and/or second predetermined position respectively.

13. The photographing apparatus according to claim 1, further comprising an information attaching means that attaches drive information of the camera shake correction means to a main photograph obtained by the main photographing.

14. A control method of a photographing apparatus which includes a photographing means that photographs a subject to obtain an image representing the subject by receiving an instruction to perform photographing, and a camera shake correction means constructed to be driven in a direction different from the optical axis of the photographing means and corrects a camera shake induced blur of an image to be obtained by the photographing, the method comprising the steps of:
    receiving an instruction to perform main photographing;
    initiating driving of the camera shake correction means from a first predetermined position during a period from the time when the instruction to perform main photographing is given to the time when the subject is photographed; and
    driving the camera shake correction means to a second predetermined position during a period from the time when the driving is initiated to the time when the main photographing is performed.

15. A non-transitory computer readable recording medium on which is recorded a program for causing a computer to perform a control method of a photographing apparatus which includes a photographing means that photographs a subject to obtain an image representing the subject by receiving an instruction to perform photographing, and a camera shake correction means constructed to be driven in a direction different from the optical axis of the photographing means and corrects a camera shake induced blur of an image to be obtained by the photographing, the program comprising the steps of:

receiving an instruction to perform main photographing;

initiating driving of the camera shake correction means from a first predetermined position during a period from the time when the instruction to perform main photographing is given to the time when the subject is photographed; and driving the camera shake correction means to a second predetermined position during a period from the time when the driving is initiated to the time when the main photographing is performed.

* * * * *